United States Patent
Andersen et al.

(10) Patent No.: US 10,723,188 B2
(45) Date of Patent: Jul. 28, 2020

(54) LIGHTWEIGHT GOOSENECK-MOUNTED TRAILER HITCH

(71) Applicant: Andersen Manufacturing, Inc., Idaho Falls, ID (US)

(72) Inventors: John I. Andersen, Idaho Falls, ID (US); Ryan B. Andersen, Idaho Falls, ID (US)

(73) Assignee: Andersen Manufacturing, Inc., Idaho Falls, ID (US)

( * ) Notice: Subject to any disclaimer, the term of this patent is extended or adjusted under 35 U.S.C. 154(b) by 0 days.

(21) Appl. No.: 15/421,783

(22) Filed: Feb. 1, 2017

(65) Prior Publication Data

US 2017/0217266 A1    Aug. 3, 2017

Related U.S. Application Data

(60) Provisional application No. 62/289,846, filed on Feb. 1, 2016, provisional application No. 62/289,851, filed on Feb. 1, 2016.

(51) Int. Cl.

| | |
|---|---|
| *B60D 1/48* | (2006.01) |
| *B60D 1/52* | (2006.01) |
| *B60D 1/58* | (2006.01) |
| *B60D 1/06* | (2006.01) |
| *B60D 1/07* | (2006.01) |
| *B62D 53/08* | (2006.01) |

(52) U.S. Cl.
CPC ............... *B60D 1/488* (2013.01); *B60D 1/06* (2013.01); *B60D 1/075* (2013.01); *B60D 1/52* (2013.01); *B60D 1/58* (2013.01); *B62D 53/0842* (2013.01); *B60Y 2304/07* (2013.01)

(58) Field of Classification Search
CPC ... B60D 1/06; B60D 1/52; B60D 1/58; B60D 1/075; B60D 1/488; B60Y 2304/07; B60P 3/04; B62D 53/0842
USPC .................................................... 280/416.1
See application file for complete search history.

(56) References Cited

U.S. PATENT DOCUMENTS

| | | |
|---|---|---|
| 2,107,510 A | 2/1938 | Skinner et al. |
| 3,321,950 A | 5/1967 | Gettig |
| 3,355,266 A | 11/1967 | O'Brien |
| 3,679,234 A | 7/1972 | Colliau |
| 3,745,873 A | 7/1973 | Lee |
| 3,774,952 A | 11/1973 | Zorn |
| 4,051,953 A | 10/1977 | Shoaf |

(Continued)

FOREIGN PATENT DOCUMENTS

JP        H0439066 A    2/1992

*Primary Examiner* — Jacob D Knutson
*Assistant Examiner* — Felicia L. Brittman
(74) *Attorney, Agent, or Firm* — Knobbe, Martens, Olson & Bear, LLP

(57) ABSTRACT

A trailer coupler system can include one or more skid plates made from extruded aluminum, one or more support tubes attached to the skid plates, a plurality of struts having a first end attached to the one or more skid plates, a ball housing attached to a second end of at least two of the plurality of struts, a first towball positioned within the ball housing, an adapter sleeve attached to the ball housing, a support plate extending from a support tube or skid plate to the adapter sleeve, an adapter having a kingpin coupler for coupling to a kingpin of a trailer, and a towball coupler for directly coupling with the first towball.

20 Claims, 27 Drawing Sheets

(56) References Cited

U.S. PATENT DOCUMENTS

| | | | |
|---|---|---|---|
| 4,111,449 A | 9/1978 | Hancock | |
| 4,305,676 A | 12/1981 | Wallbank | |
| 4,485,597 A | 12/1984 | Worrallo | |
| 4,738,293 A | 4/1988 | Ostrom et al. | |
| 4,889,212 A | 12/1989 | Temple | |
| 5,037,122 A | 8/1991 | Beckerer, Jr. | |
| 5,240,266 A | 8/1993 | Kelley et al. | |
| 5,357,775 A | 10/1994 | Nakazawa et al. | |
| 5,433,357 A | 7/1995 | Alliff | |
| 5,458,389 A | 10/1995 | Young | |
| 5,600,990 A | 2/1997 | Kelly et al. | |
| 5,620,198 A | 4/1997 | Borchers | |
| 6,138,992 A | 10/2000 | Bell | |
| 6,158,761 A | 12/2000 | King | |
| 6,199,892 B1 | 3/2001 | Dahl | |
| 6,264,229 B1 * | 7/2001 | Gill | B60D 1/065 |
| | | | 280/441.2 |
| 6,290,247 B1 | 9/2001 | Schafer et al. | |
| 6,308,977 B1 | 10/2001 | Pulliam et al. | |
| 6,352,228 B1 | 3/2002 | Buerklin | |
| 6,382,656 B1 | 5/2002 | Johnson, Jr. | |
| 6,419,258 B1 | 7/2002 | Grote | |
| 6,464,240 B1 | 10/2002 | Seksaria et al. | |
| D469,723 S | 2/2003 | McCoy et al. | |
| 6,663,055 B2 | 12/2003 | Boucher et al. | |
| 6,669,223 B2 | 12/2003 | Seksaria et al. | |
| 8,220,818 B1 | 7/2012 | Pulliam et al. | |
| 8,272,662 B2 | 9/2012 | McCoy et al. | |
| 9,669,672 B2 | 6/2017 | Ye | |
| 10,065,467 B2 | 9/2018 | Pulliam et al. | |
| 2002/0113405 A1 | 8/2002 | Moss et al. | |
| 2002/0171226 A1 | 11/2002 | McCoy et al. | |
| 2003/0038453 A1 | 2/2003 | Seksaria et al. | |
| 2003/0052472 A1 | 3/2003 | Moss et al. | |
| 2003/0080534 A1 | 5/2003 | Freeman | |
| 2003/0090085 A1 | 5/2003 | Seksaria et al. | |
| 2003/0106348 A1 | 6/2003 | Nilges | |
| 2004/0032112 A1 | 2/2004 | Reese et al. | |
| 2004/0113390 A1 * | 6/2004 | Broussard, III | B60D 1/06 |
| | | | 280/415.1 |
| 2005/0067812 A1 | 3/2005 | Moss et al. | |
| 2006/0027997 A1 * | 2/2006 | Grace | B60D 1/143 |
| | | | 280/417.1 |
| 2012/0280473 A1 | 11/2012 | Andersen | |

\* cited by examiner

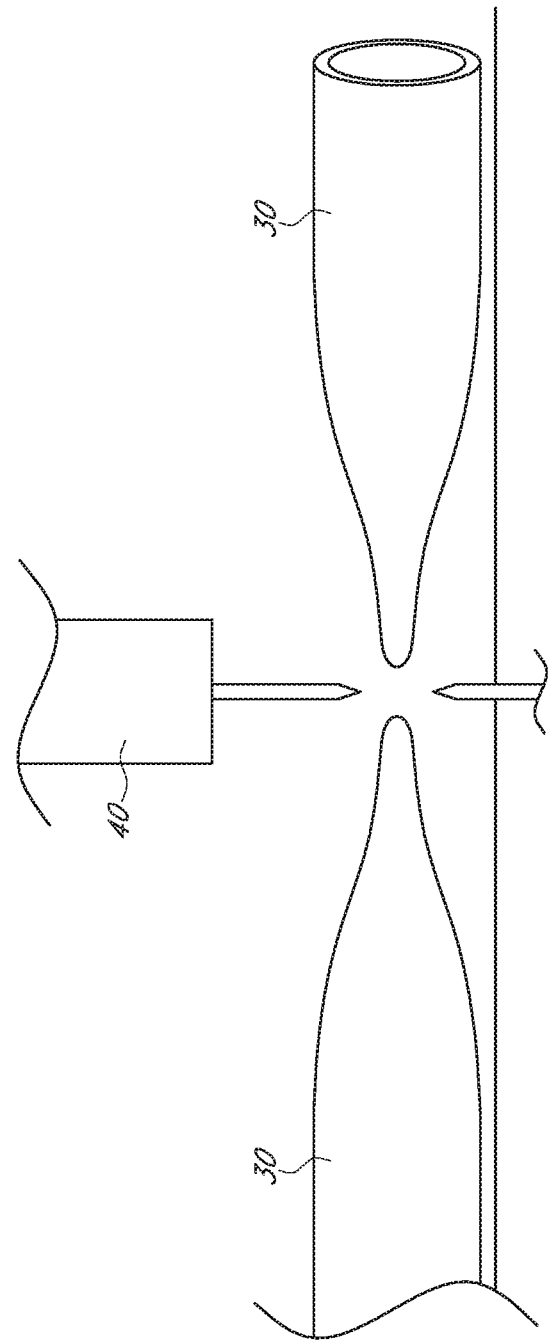

LIGHTWEIGHT GOOSENECK-MOUNTED TRAILER HITCH

INCORPORATION BY REFERENCE TO ANY PRIORITY APPLICATIONS

The present application claims priority benefit to U.S. Provisional Application No. 62/289,851, filed Feb. 1, 2016, titled "EXTRUDED ALUMINUM TRAILER COUPLER SYSTEM AND HITCH ADAPTER," and U.S. Provisional Application No. 62/289,846, filed Feb. 1, 2016, titled "SYSTEMS AND METHODS FOR IMPROVING TOWABILITY OF A NON-KINGPIN TRAILER," which are hereby incorporated by reference herein in entirety.

FIELD OF DISCLOSURE

The present disclosure generally relates to coupler systems. More specifically, the disclosure describes, among other things, trailer coupler systems that can provide an adapter to connect a vehicle to another vehicle, and/or a trailer.

BACKGROUND

Generally described, aspects of the present disclosure relate to a lightweight and strong trailer coupler system made of extruded aluminum that is configured to be installed in the bed of a truck and to couple to a trailer. The trailer coupler system can be configured to be strong enough to tow a trailer (e.g., a horse trailer or consumer RV) while weighing less than or equal to about 45 pounds. The trailer coupler system can include a pin adapter with a greaseless towball coupler configured to couple to the towball of the coupler system with little or no need to use grease. The disclosed trailer coupler systems can be configured to reduce stresses on the trailer, transferring at least a portion of those stresses on the truck with the trailer coupler system.

Aspects of the present disclosure also relate to an adapter hitch for a trailer. The adapter can include a greaseless towball coupler configured to receive a towball with little or no need to use grease. The adapter hitch can include a funnel configuration to facilitate seating a towball within the greaseless towball coupler. The greaseless towball coupler can also be manufactured using extruded aluminum.

Aspects of the present disclosure also relate to the use of the disclosed trailer coupler systems with the disclosed adapter hitches with a trailer such as a horse trailer. This combination of devices can effectively shorten the stem portion extending from the trailer to the towball in the truck.

The fifth wheel coupling generally provides a link between a semi-trailer and a towing truck, tractor unit, leading trailer, or dolly. Typically, the coupling consists of a coupling pin, or king pin, on the front of the towed trailer, and a horseshoe-shaped coupling device called a fifth wheel on the rear of the towing vehicle. The fifth wheel pivotally accepts or receives the king pin thereby coupling the trailer to the towing truck.

A consumer grade fifth wheel hitch is commonly employed for coupling a recreational vehicle (RV) or trailer to a consumer vehicle, such as a pickup truck. The consumer fifth wheel hitch is generally patterned after the large commercial fifth wheel hitches used for towing industrial vehicles. Consumer grade fifth wheel hitches are not required to carry heavy industrial loads, and are therefore generally designed to be much lighter and smaller than commercial fifth wheel hitches. However, these lighter-weight copies still weigh much more than a single person can conveniently lift and position. In fact, some consumer fifth wheel hitches require the efforts of 3 or 4 people to lift and position the hitch in the bed of the towing vehicle. Similarly, the efforts of multiple people are required to remove the hitch from the towing vehicle should the user wish to use the bed of the towing vehicle for hauling other materials. This inconvenience commonly results in the user leaving the hitch installed as a permanent fixture in the bed of the towing vehicle.

The process of installing a consumer grade fifth wheel hitch in the bed of a towing vehicle often requires extensive modification to the towing vehicle. These modifications are largely dependent upon the bolt-hole pattern of the hitch, as well as the structural features of the towing vehicle's frame and bed. Since the structural features of both fifth wheel hitches and towing vehicles vary greatly between manufacturers, the pairing and installation of a consumer fifth wheel hitch becomes a custom procedure. Thus, when a user purchases a new towing vehicle or a new fifth wheel hitch, the hitch must be custom installed in the towing vehicle.

Thus, while techniques currently exist that relate to equipping consumer towing vehicles with consumer grade fifth wheel hitches, challenges still exist. Accordingly, it would be an improvement in the art to augment or even replace current techniques with other techniques.

Trailers, including cargo trailers, boat trailers, recreational vehicles, animal trailers, camping trailers and mobile homes, are designed to be towed behind a motor vehicle. During transport, the front end of the trailer is supported by and connected to the vehicle by an apparatus. A truck having a bed, with a connecting apparatus in the bed of the truck, is commonly used to tow trailers. A fifth-wheel trailer connects to a towing vehicle by a fifth-wheel hitch that is mounted on a frame within the vehicle bed such that the actual connecting apparatus is located above the plane of the truck bed. A gooseneck trailer connects directly to the towing vehicle via a ball hitch in the bed of the truck.

Fifth-wheel trailers commonly extend over at least a portion of the bed of the truck and attach to a hitch near the middle of the truck bed. A person who owns both a gooseneck trailer and a fifth-wheel trailer generally needs to own two different trailer hitches and a different trailer hitch must be installed, and/or removed, each time a different trailer is needed. It can also be difficult to mate the trailer to the coupling apparatus, further complicating the installation process.

Thus, it would be advantageous to provide a hitch adapter which allows the user to couple a standard fifth-wheel trailer to a standard ball hitch. Further, it would be advantageous to provide a hitch that is easy to install and remove and that permits vertical adjustment of the trailer.

SUMMARY

The systems, methods and devices of the disclosure each have innovative aspects, no single one of which is indispensable or solely responsible for the desirable attributes disclosed herein. Some of the advantageous features of some embodiments will now be summarized.

According to some embodiments, a trailer coupler system comprises one or more skid plates made from extruded aluminum; one or more support tubes attached to the skid plates, the support tubes comprising extruded aluminum; a plurality of struts having a first end attached to the one or more skid plates, the plurality of struts being made from extruded aluminum; a ball housing attached to a second end of at least two of the plurality of struts, the ball housing being made from extruded aluminum; a first towball positioned within the ball housing, the first towball made from extruded aluminum; an adapter sleeve attached to the ball housing, the adapter sleeve configured to be secured to a towball in a towing vehicle, the adapter sleeve being made from extruded aluminum; a support plate extending from a support tube or skid plate to the adapter sleeve; and an adapter having a kingpin coupler for coupling to a kingpin of a trailer, and a towball coupler for directly coupling with the first towball, wherein the trailer coupler system weighs less than or equal to about 45 pounds.

In some embodiments, the support plate is attached a first skid plate of the one or more skid plates and a second support plate is attached to a second skid plate of the one or more skid plates. In some embodiments, the support plate is made from steel. In some embodiments, the support plate is the only component not made from extruded aluminum.

According to some embodiments, a method of manufacturing an extruded aluminum trailer coupler system comprises: extruding aluminum to form extruded aluminum with a tubular cross-section; shearing the extruded aluminum with a tubular cross-section such that points where the extruded aluminum is sheared flatten to close a lumen of the tubular-cross section to form a plurality of tubular struts; extruding aluminum to form extruded aluminum with a cross-section having a squared-off u-shape; cutting the extruded aluminum with the cross-section having a squared-off u-shape to form a plurality of skid plates; extruding aluminum to form extruded aluminum with a hollow, rectangular cross-section; cutting the extruded aluminum with the hollow, rectangular cross-section to form a plurality of support tubes; forming a base of the trailer coupler system performing at least the steps of: welding a first skid plate to two support tubes near respective first ends of the two support tubes; and welding a second skid plate to the two support tubes near respective second ends of the two support tubes; welding two or more of the plurality of tubular struts to the first skid plate; welding two or more of the plurality of tubular struts to the second skid plate; and welding the four or more tubular struts to a ball housing made of extruded aluminum such that a towball secured within the ball housing is positioned between about 10 inches and about 21 inches above the base of the trailer coupler system.

In some embodiments, the method further comprises welding one part of a support plate that is not made from extruded aluminum to an adapter sleeve coupled to the ball housing and another part of the support plate to at least one of the skid plates or the support tubes forming the base of the trailer coupler system.

According to some embodiments, a hitch adapter for coupling a first vehicle having a first king pin and king pin box to a second vehicle with a ball hitch comprises: a towball interface comprising a housing and a towball receptacle, the towball receptacle comprising a high density polyethylene material, the housing forming a funnel structure above the towball receptacle to facilitate engaging the ball hitch within the towball receptacle; a mounting sleeve comprising a lumen configured to receive the towball interface and a base plate configured to attach to the king pin box, wherein the towball interface comprises extruded aluminum.

BRIEF DESCRIPTION OF THE DRAWINGS

Aspects and advantages of the embodiments provided herein are described with reference to the following detailed description in conjunction with the accompanying drawings.

Throughout the drawings, reference numbers may be re-used to indicate correspondence between referenced elements. The drawings are provided to illustrate example embodiments described herein and are not intended to limit the scope of the disclosure.

FIG. 1D illustrates an embodiment of an extrusion process for creating components of the disclosed trailer coupler systems.

DETAILED DESCRIPTION

Typical hitches used by towing vehicles to couple to trailers can be large, heavy, and cumbersome. New designs were conceived to make the hitches lighter and smaller but still maintain their strength. To make these hitches strong, they were typically made from steel. However, such hitches were still heavy and usually required multiple people to load and unload the hitch from the bed of the towing vehicle. In such cases, it was unlikely that, once installed, the person would choose to remove the hitch from the towing vehicle. This could limit the use of the towing vehicle and/or create an undesirable aesthetic. Thus, it would be advantageous to provide a hitch or trailer coupler system that is strong and light that would allow a single person to reasonably install and remove.

Described herein are systems for coupling a trailer to a truck, the systems being lightweight and strong. These systems can be used to couple a wide variety of trailers to a vehicle with a towball, particularly vehicles with a towball in the bed portion of the vehicle. Although some of the disclosure herein uses a fifth wheel trailer coupler system as an example, the disclosure herein should not be limited to this particular implementation. For example, the systems described herein can be used in conjunction with horse trailers or other such trailers. In addition, although much of the description focuses on the use of extruded aluminum to manufacture the systems, other extruded metals may be used. The disclosed systems include lightweight coupler systems that are easily attached and removed from the bed of a vehicle.

The term "coupler system" as used herein shall include a fifth wheel coupler system, such as the Ultimate Connection coupler system by Andersen Manufacturing, Inc. The term shall further include other standard fifth wheel and trailer coupler systems, wherein the standard systems are modified to provide the benefits discussed herein.

Extrusion

To make the disclosed trailer coupler systems and adapter hitches lightweight and strong, the systems can be manufactured using extruded aluminum pieces. Examples of manufacturing trailer coupler systems (e.g., tow hitches) are provided in U.S. Pat. No. 6,908,099 to Andersen, issued Jun. 21, 2005, entitled "Systems and methods for providing aluminum hitch components," the entirety of which is incorporated herein by reference.

Figure 1A:
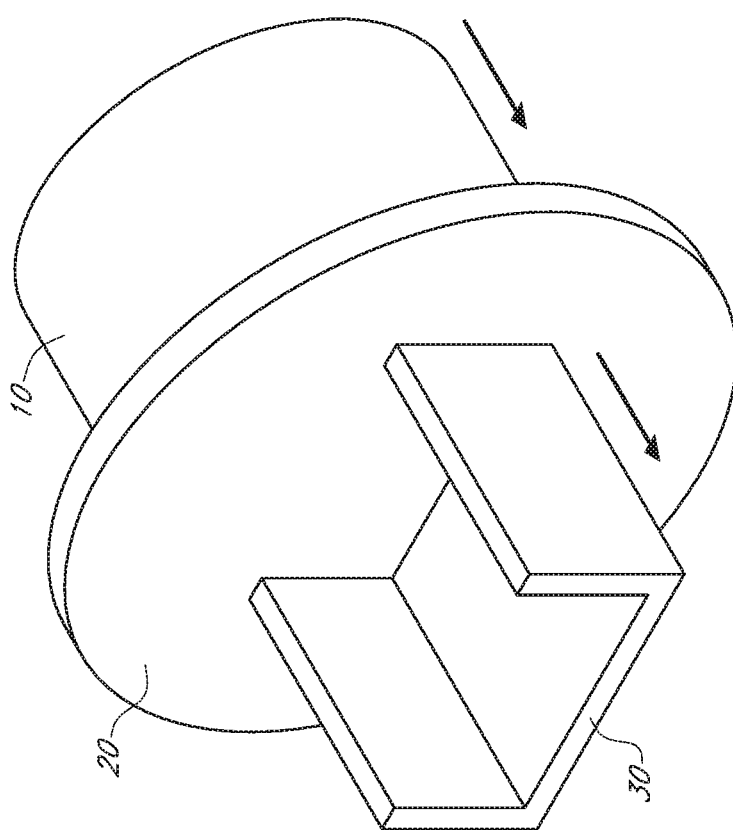
FIG. 1A illustrates an embodiment of an extrusion process for creating components of the disclosed trailer coupler systems.
Figure 1B:
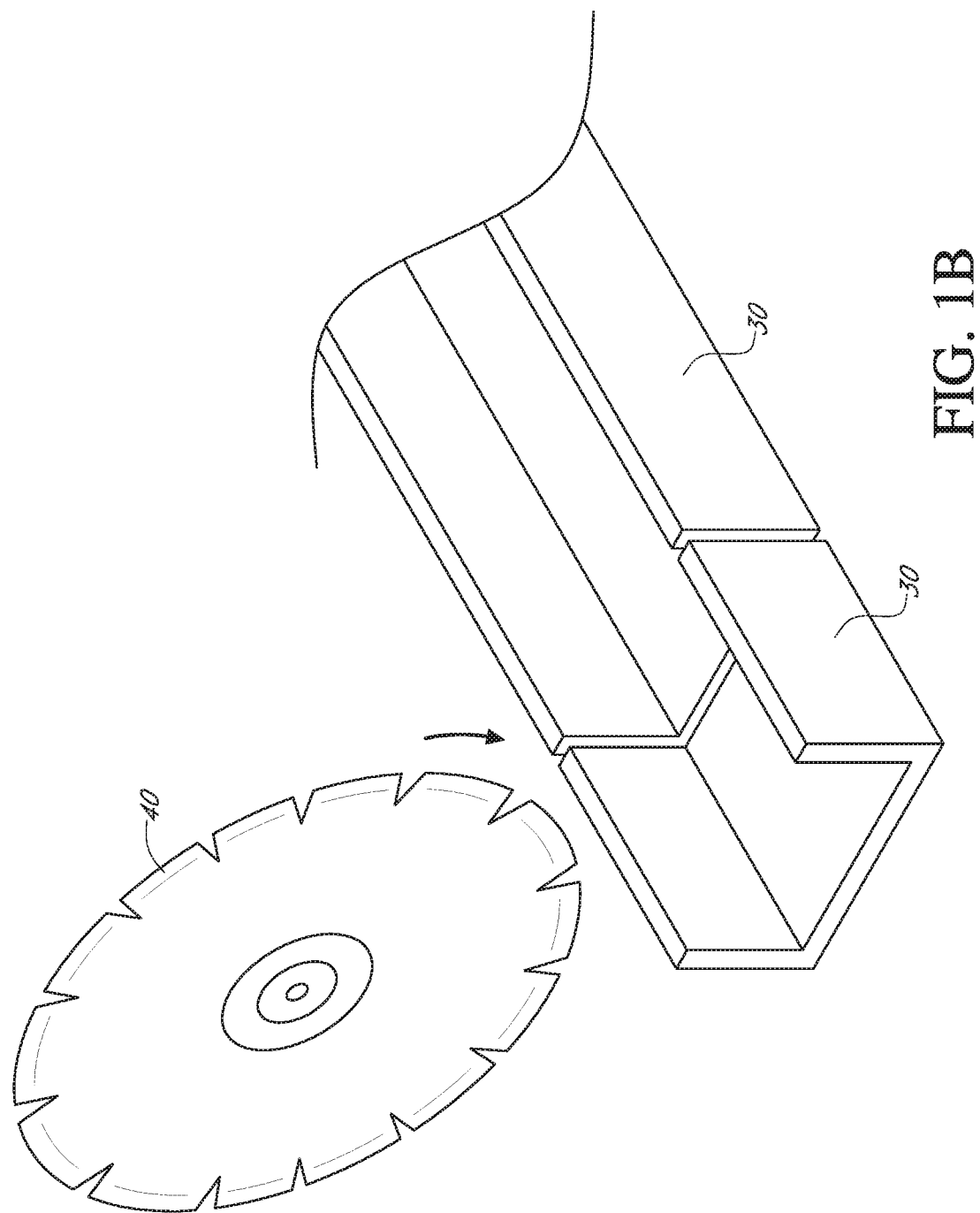
FIG. 1B illustrates an embodiment of an extrusion process for creating components of the disclosed trailer coupler systems.
Figure 1C:
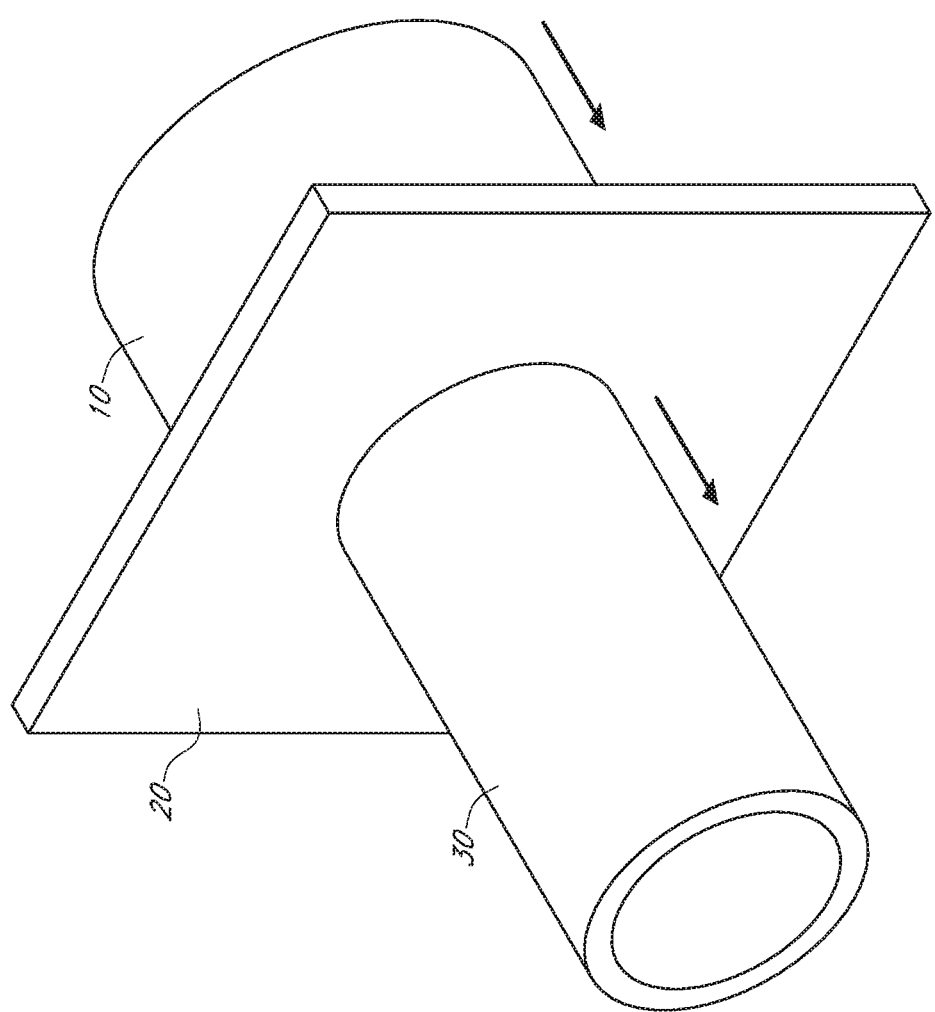
FIG. 1C illustrates an embodiment of an extrusion process for creating components of the disclosed trailer coupler systems.
Figure 2:
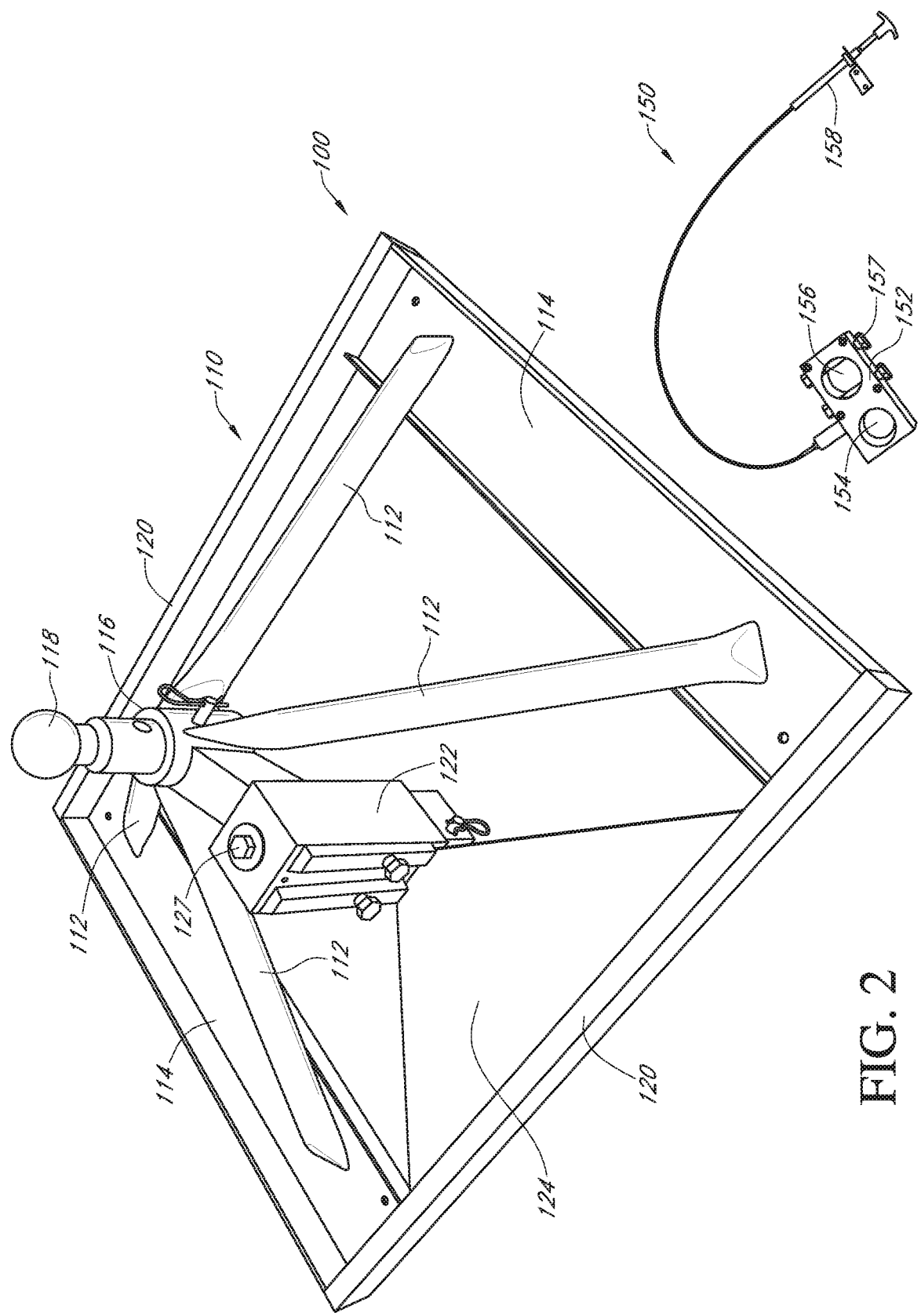
FIG. 2 illustrates a perspective view of an example trailer coupler system.
Figure 3:
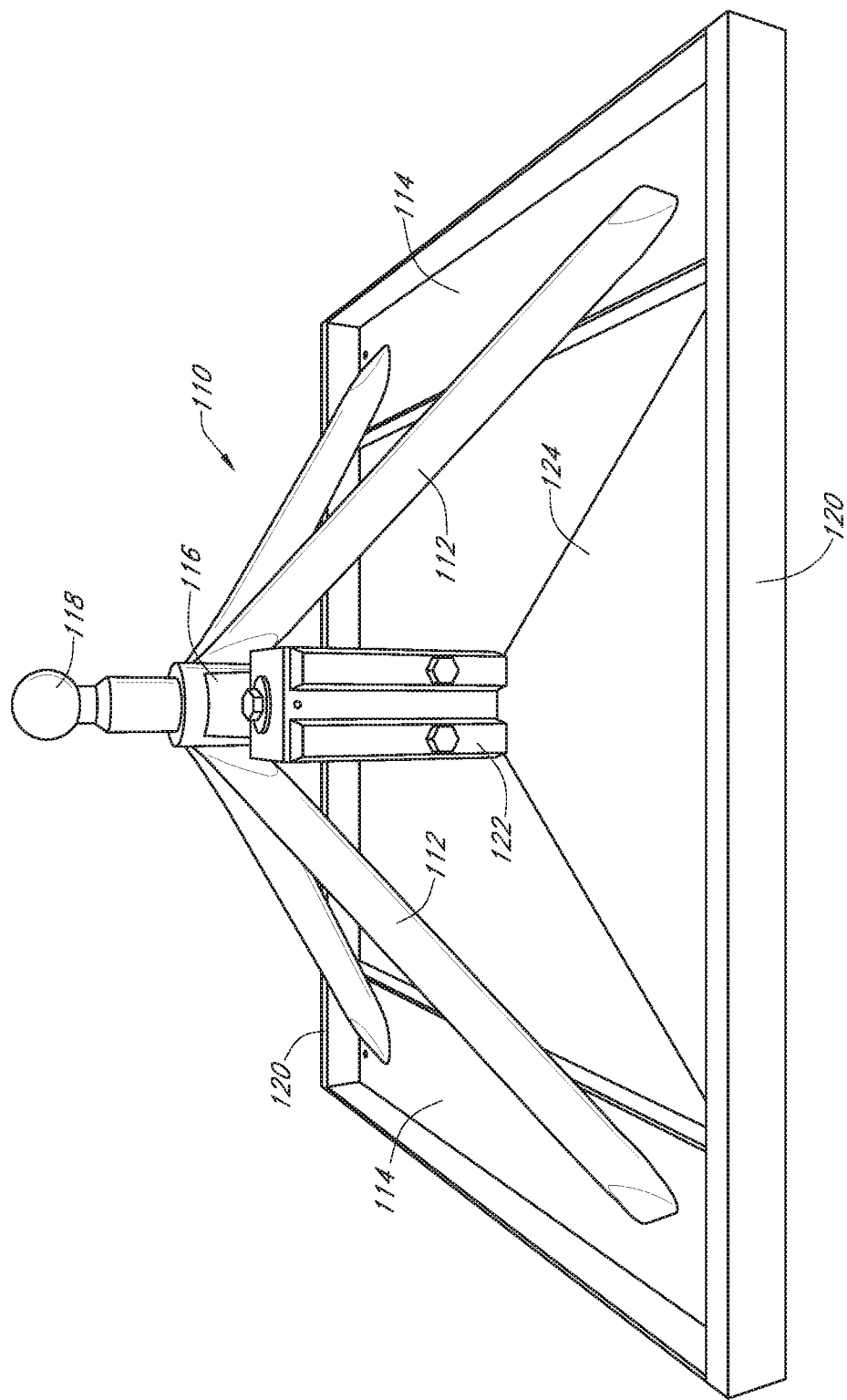
FIG. 3 illustrates a side view of an example trailer coupler system.
Figure 4:
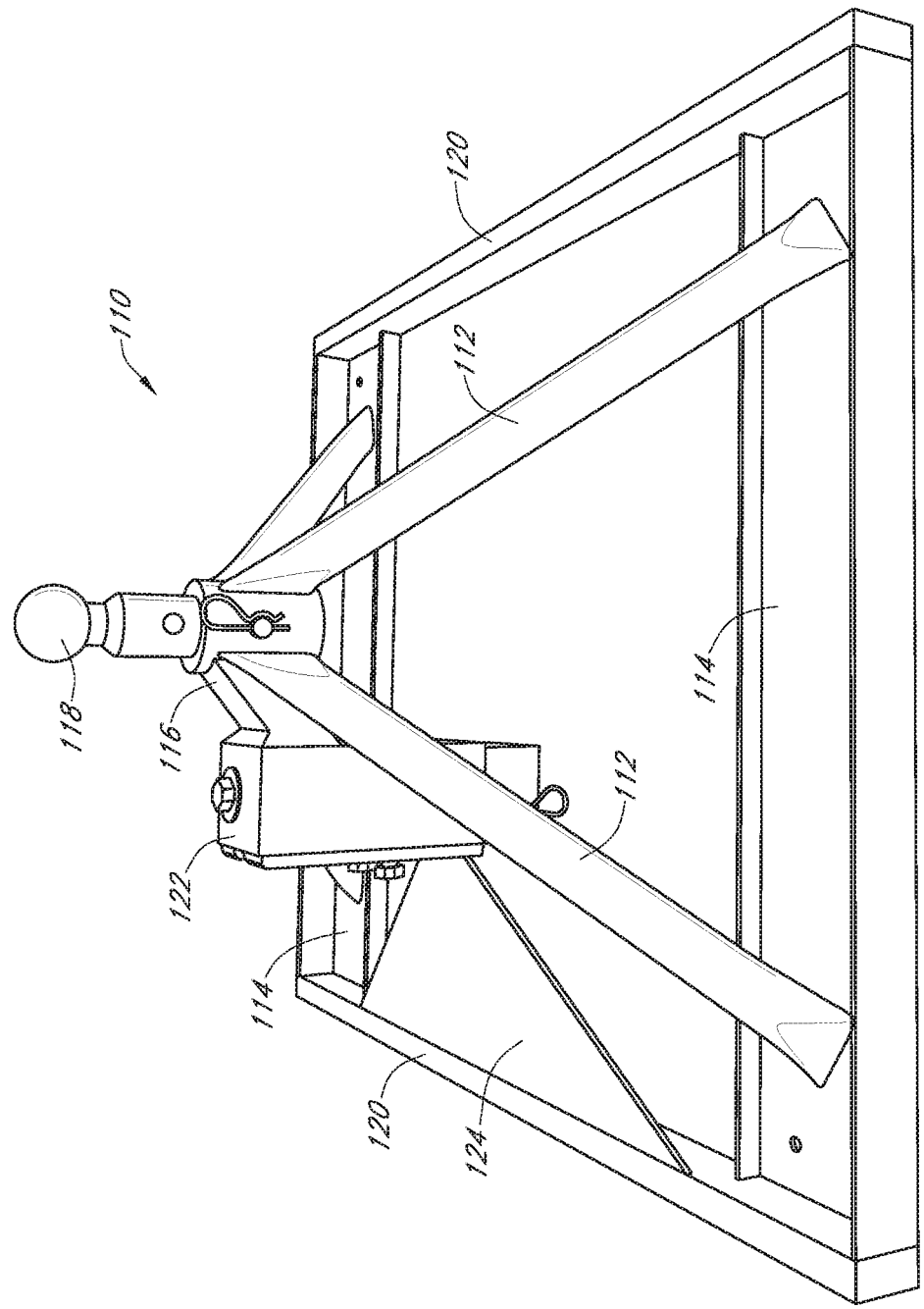
FIG. 4 illustrates a side view of an example trailer coupler system.
Figure 5:
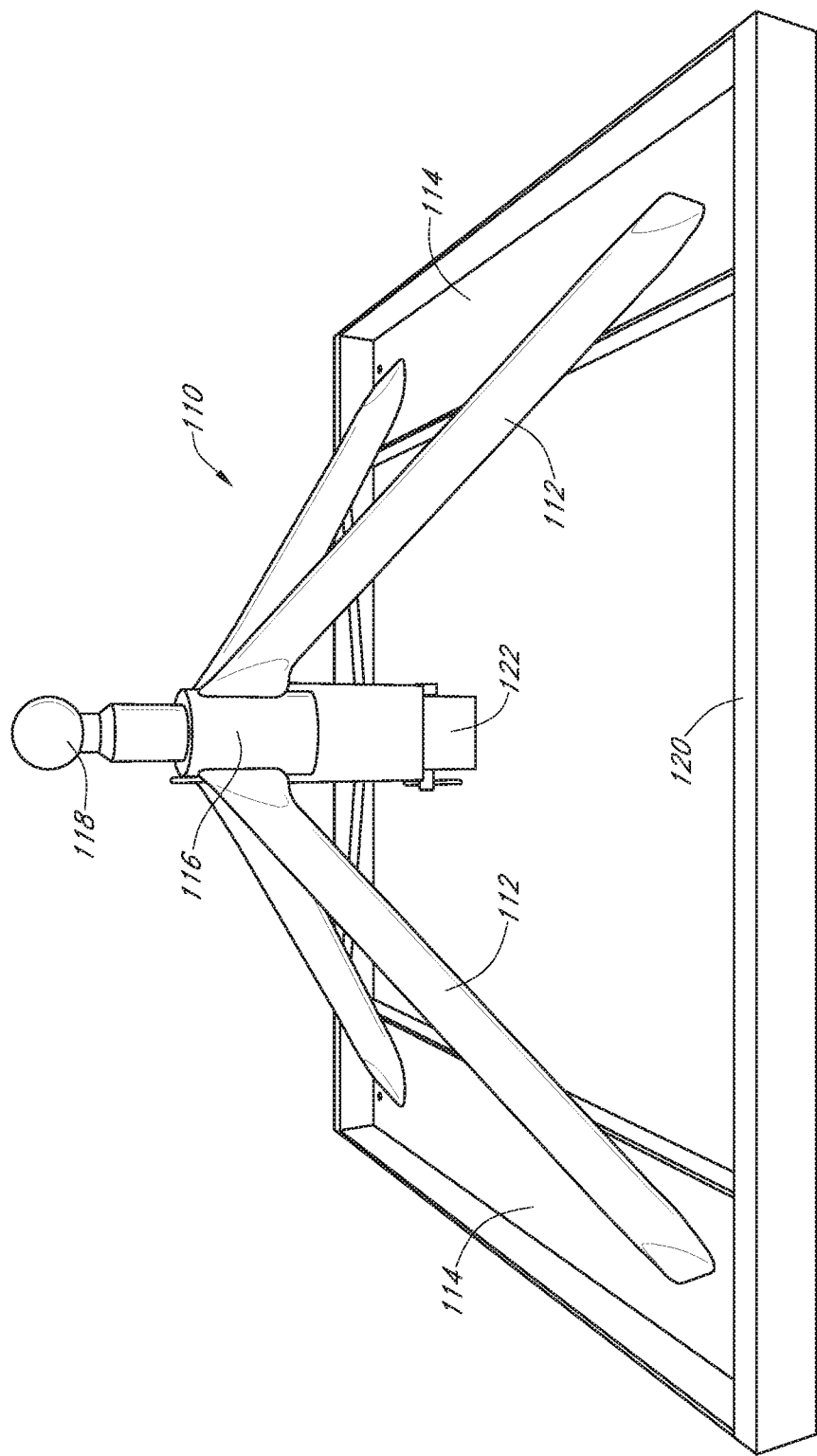
FIG. 5 illustrates a side view of an example trailer coupler system.
Figure 6:
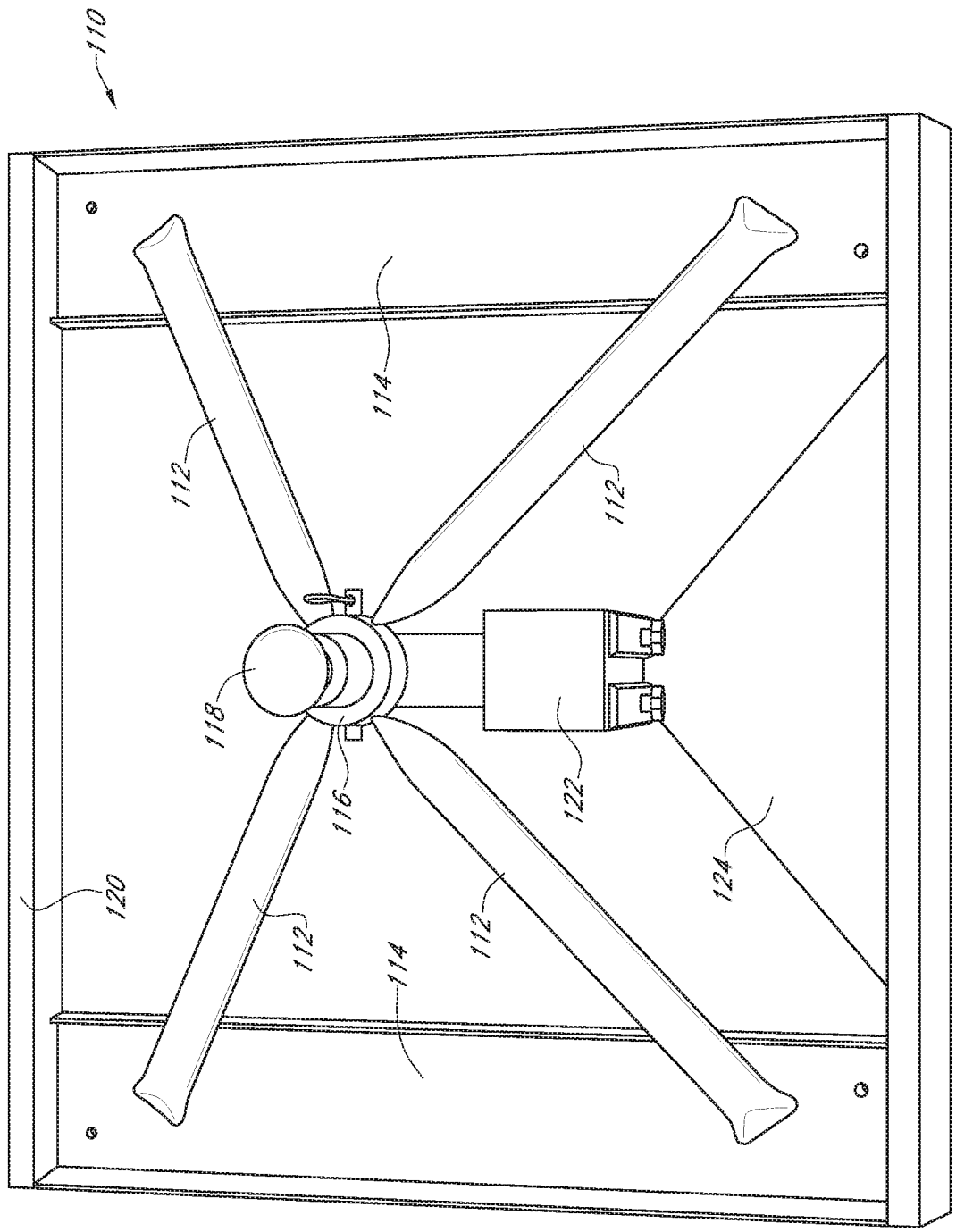
FIG. 6 illustrates a top perspective view of an example trailer coupler system.
Figure 7:
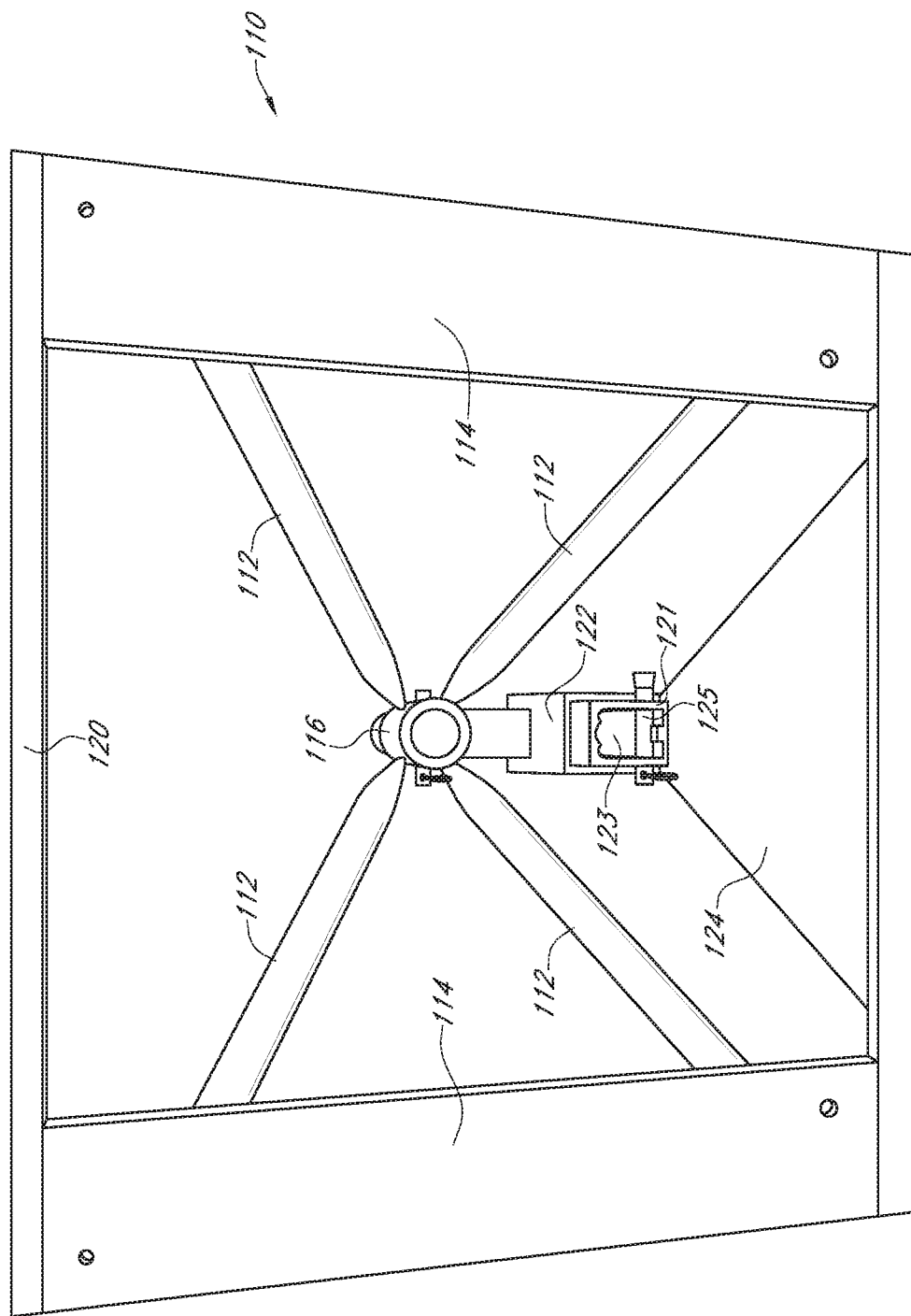
FIG. 7 illustrates a bottom perspective view of an example trailer coupler system.
Figure 8:
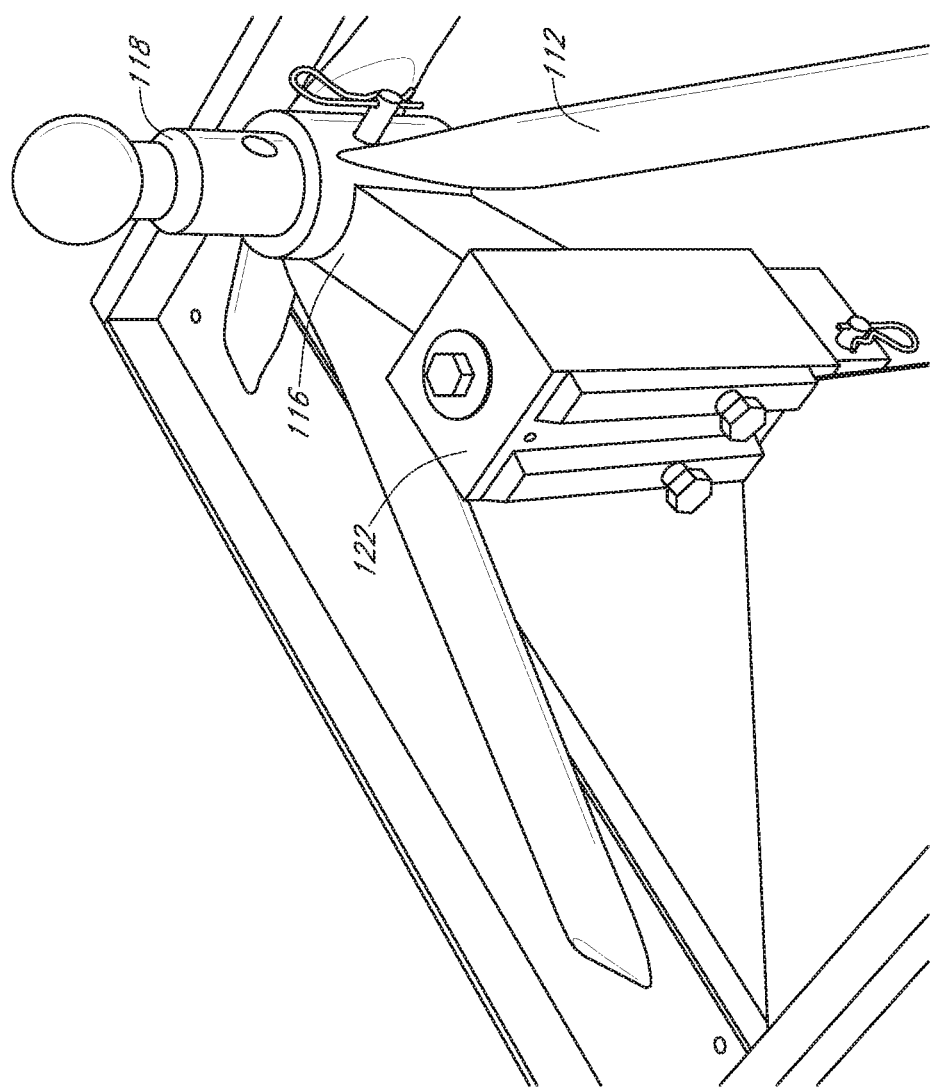
FIG. 8 illustrates a portion of an example trailer coupler system.
Figure 9:
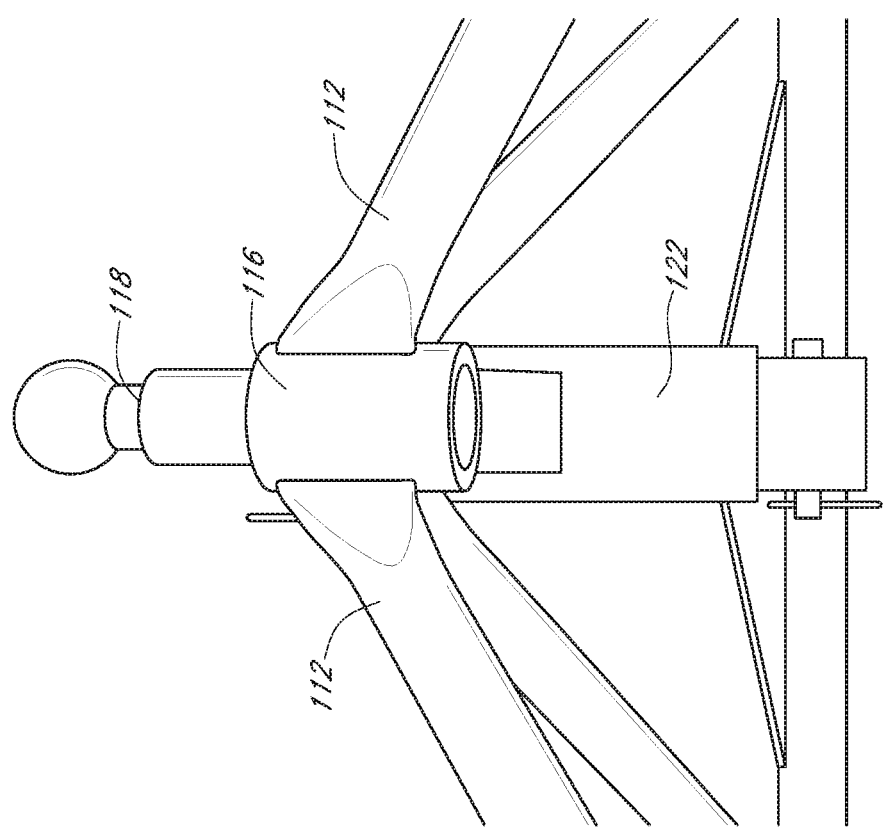
FIG. 9 illustrates a portion of an example trailer coupler system.
Figure 10:
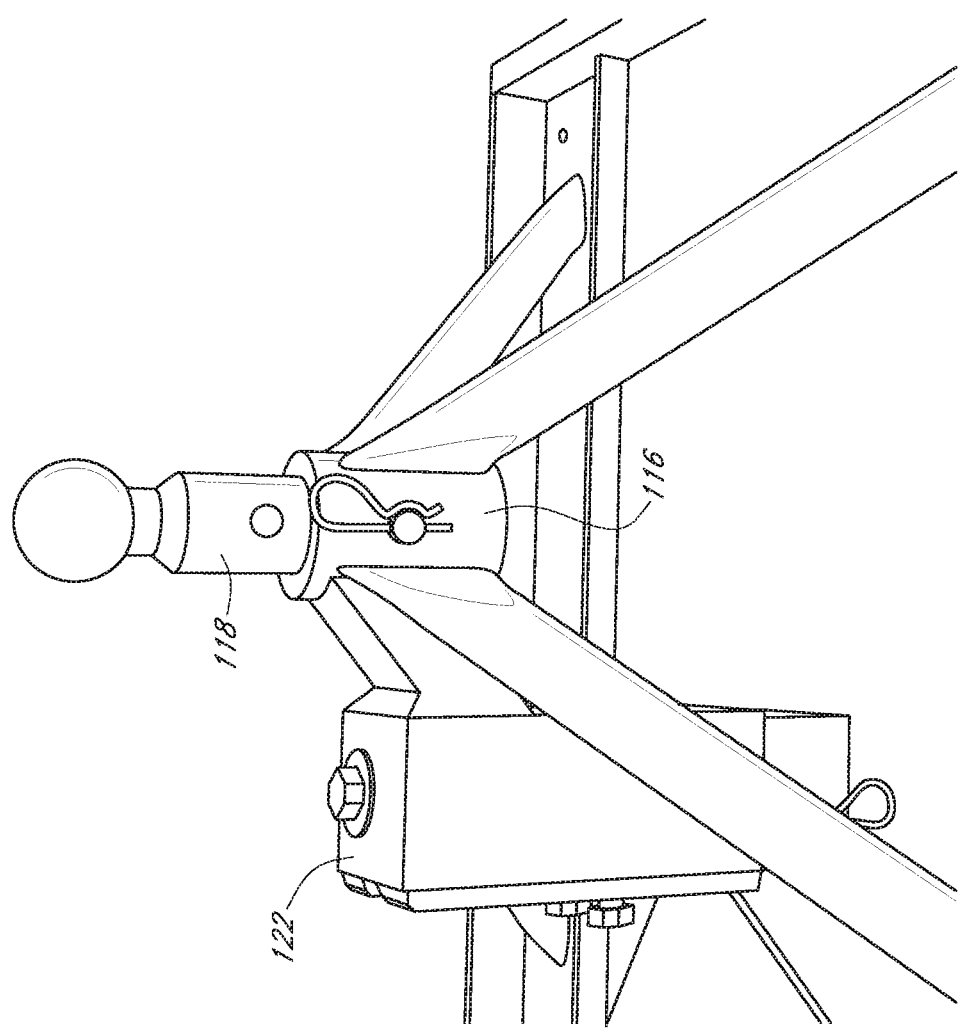
FIG. 10 illustrates a portion of an example trailer coupler system.
Figure 11:
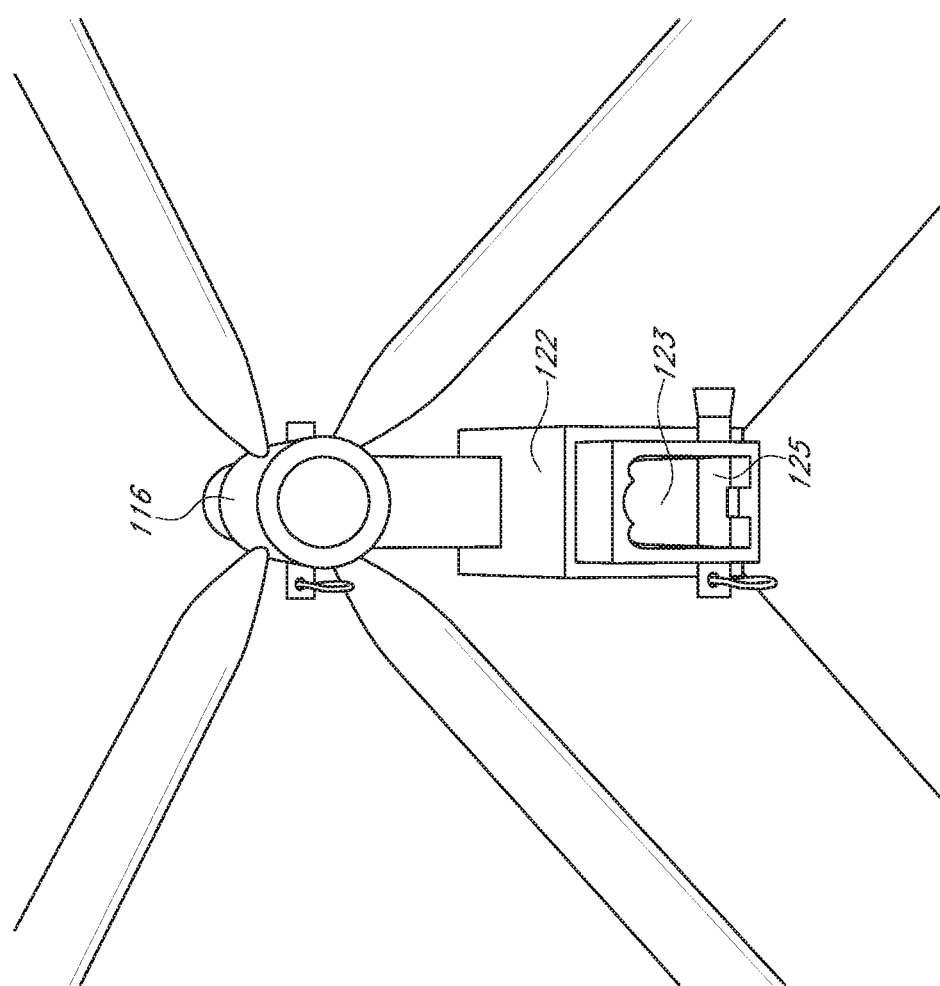
FIG. 11 illustrates a portion of an example trailer coupler system.
Figure 12:
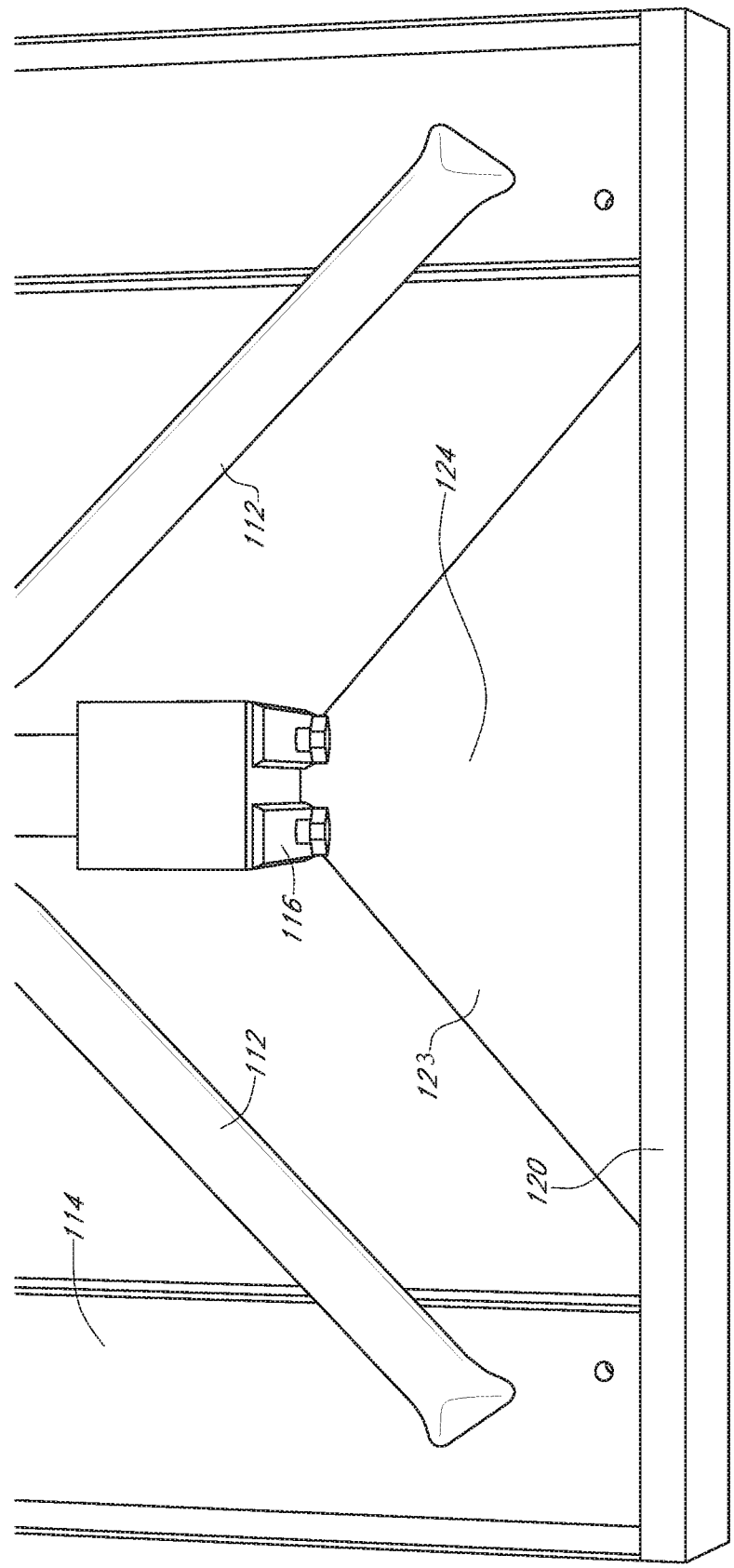
FIG. 12 illustrates a portion of an example trailer coupler system.
Figure 13:
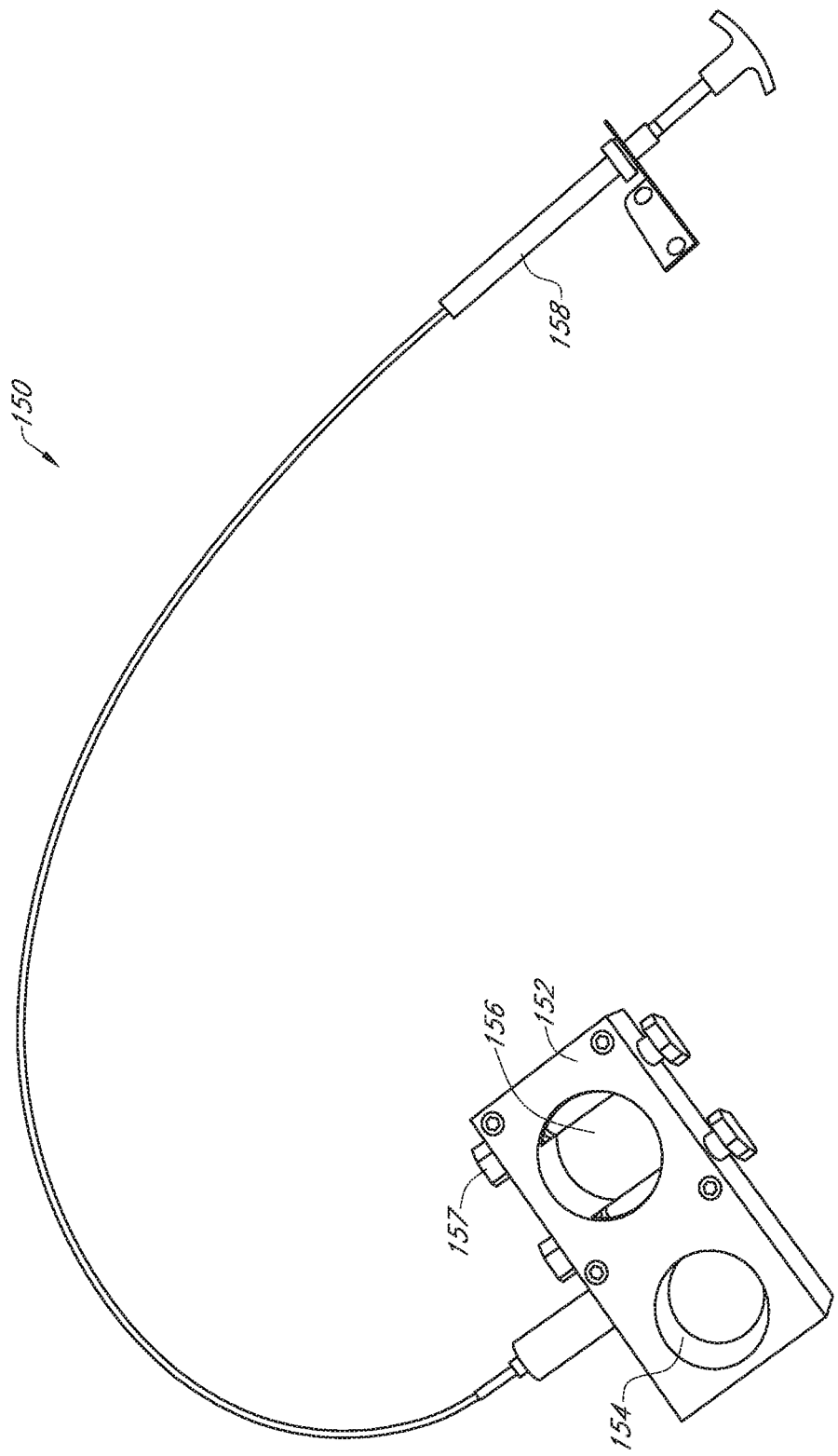
FIG. 13 illustrates an example trailer coupler system.
Figure 14:
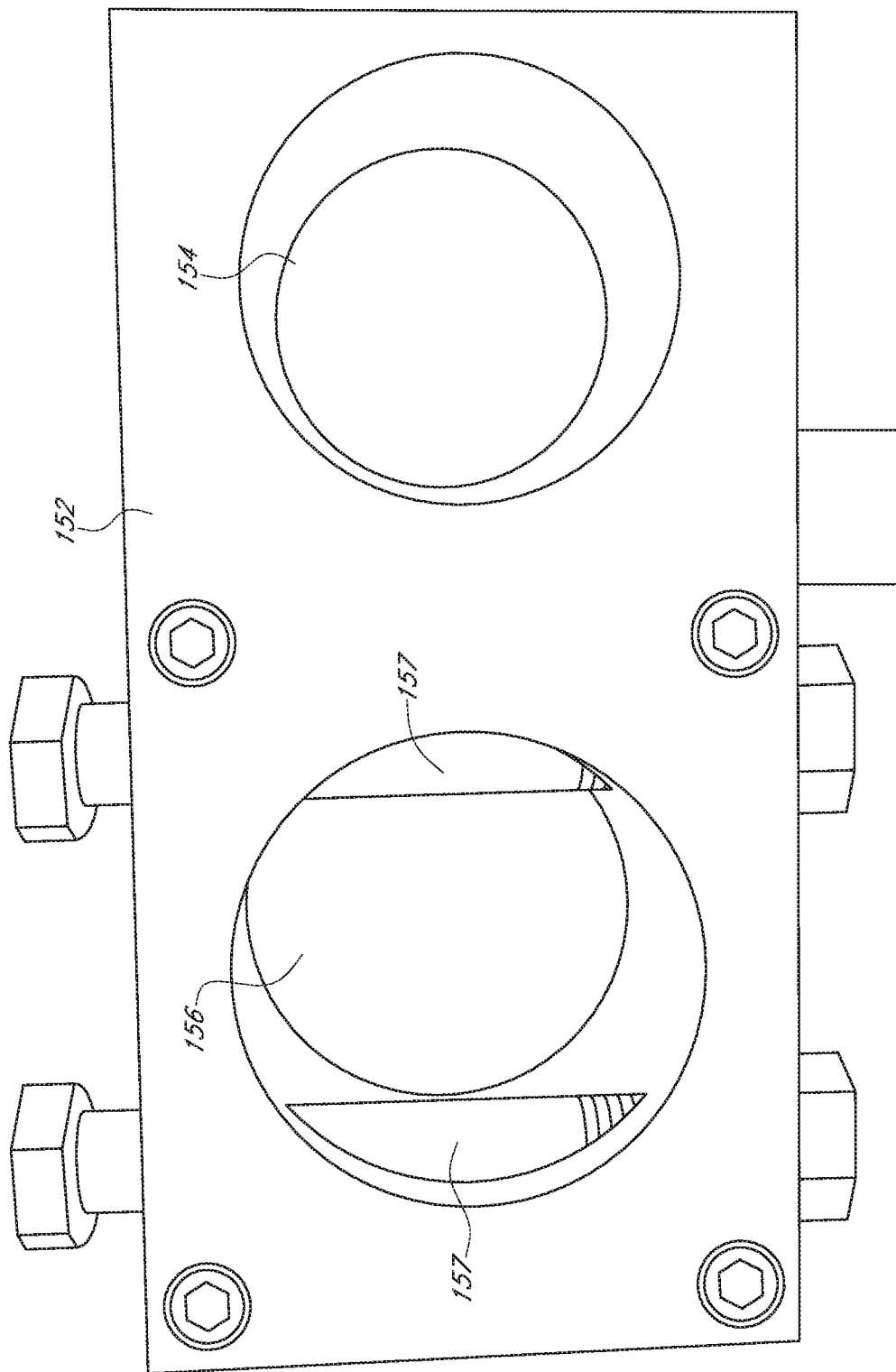
FIG. 14 illustrates a close-up view of a portion of an example trailer coupler system.
Figure 15:
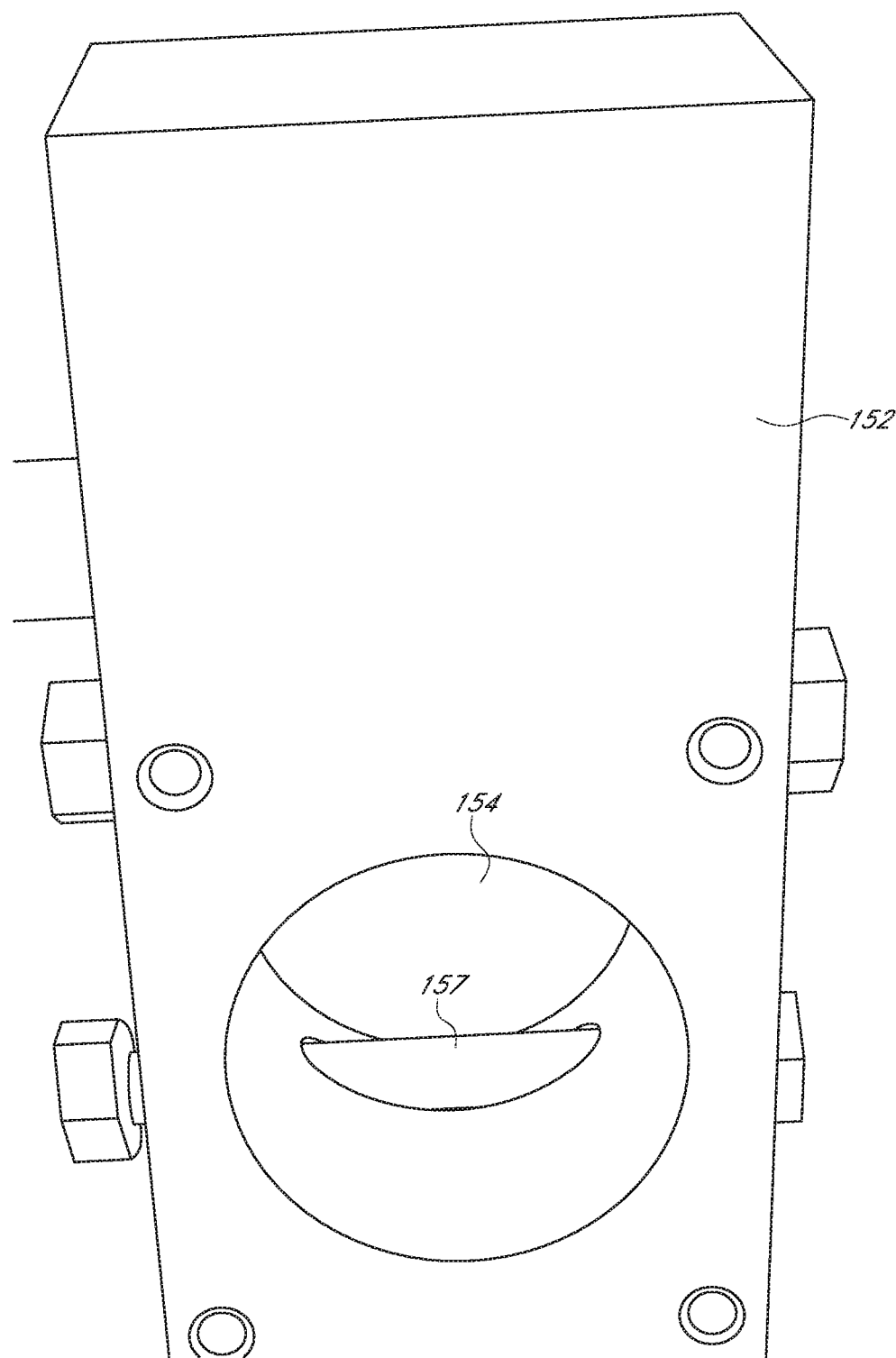
FIG. 15 illustrates a close-up view of a portion of an example trailer coupler system.
Figure 16:
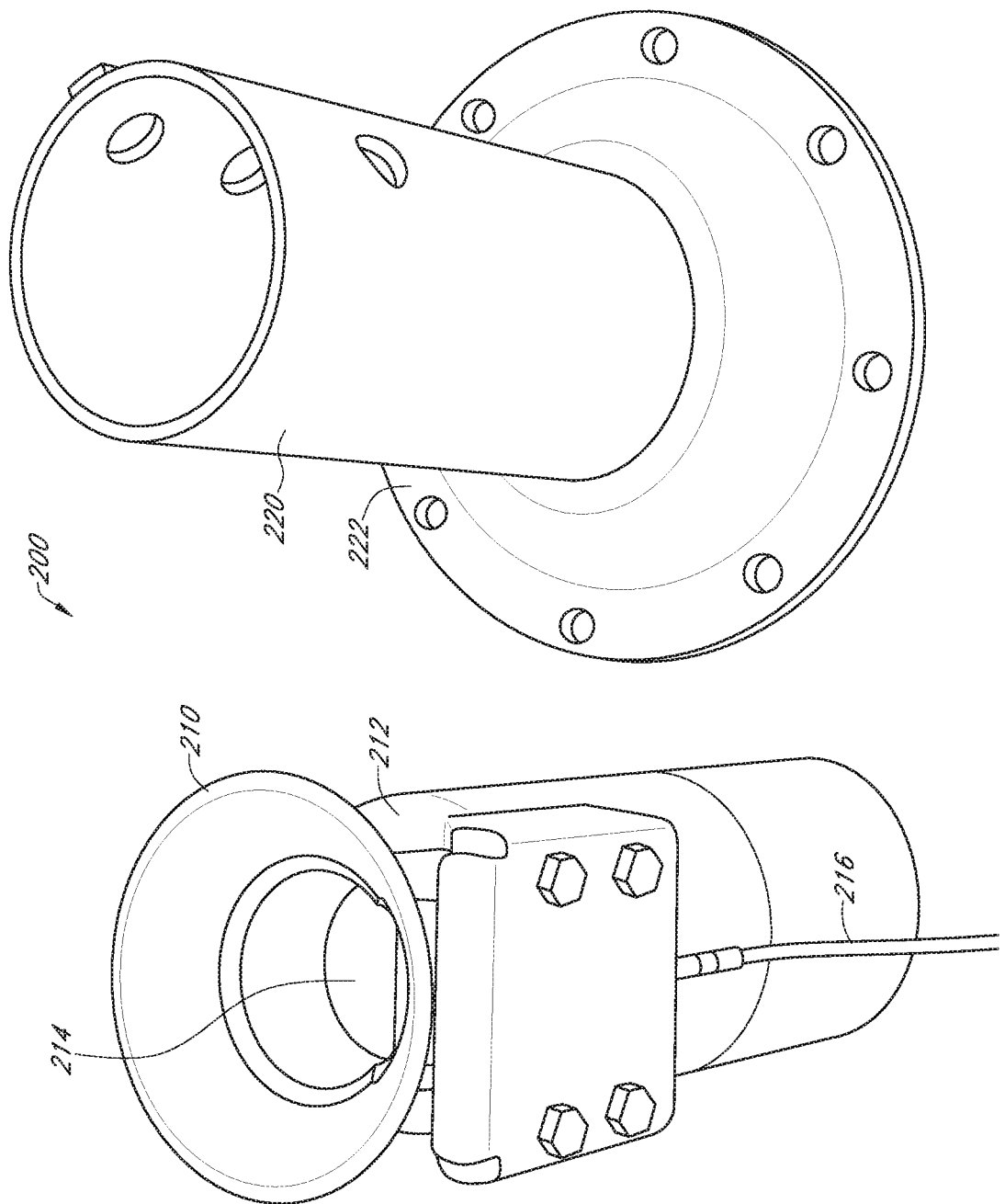
FIG. 16 illustrates an example hitch adapter.
Figure 17:
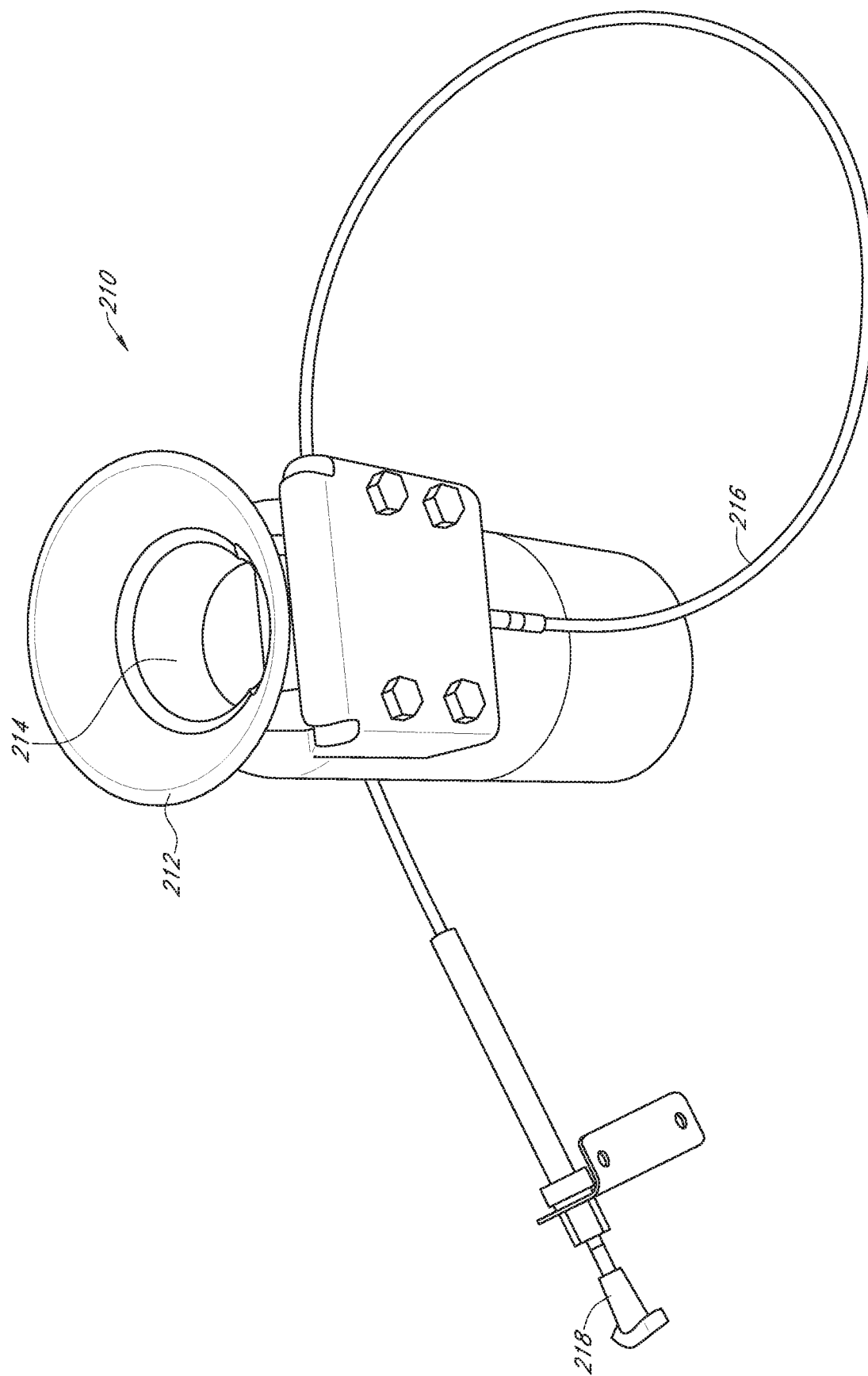
FIG. 17 illustrates a top perspective view of an example hitch adapter.
Figure 18:
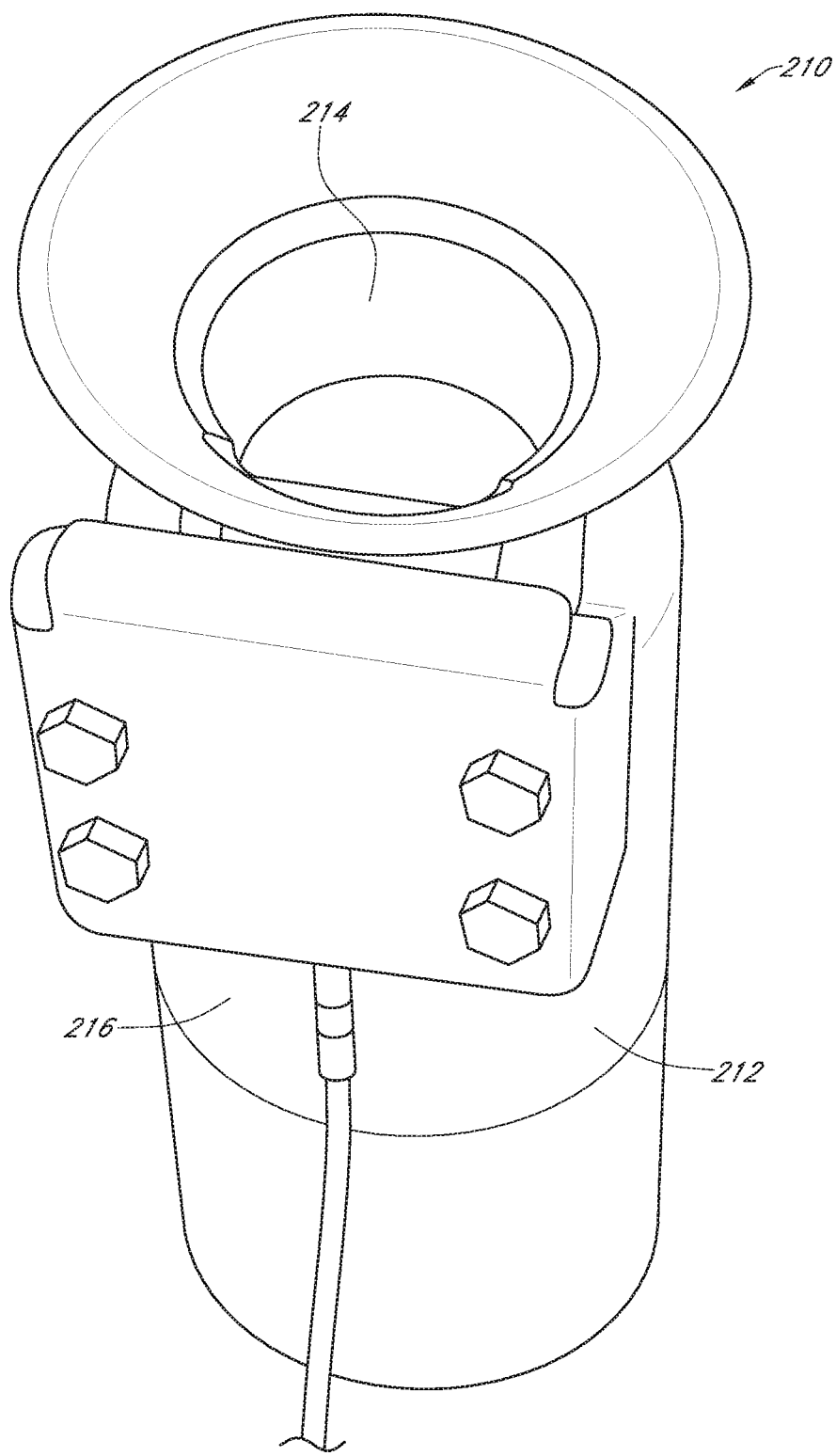
FIG. 18 illustrates a side perspective view of an example hitch adapter.
Figure 19:
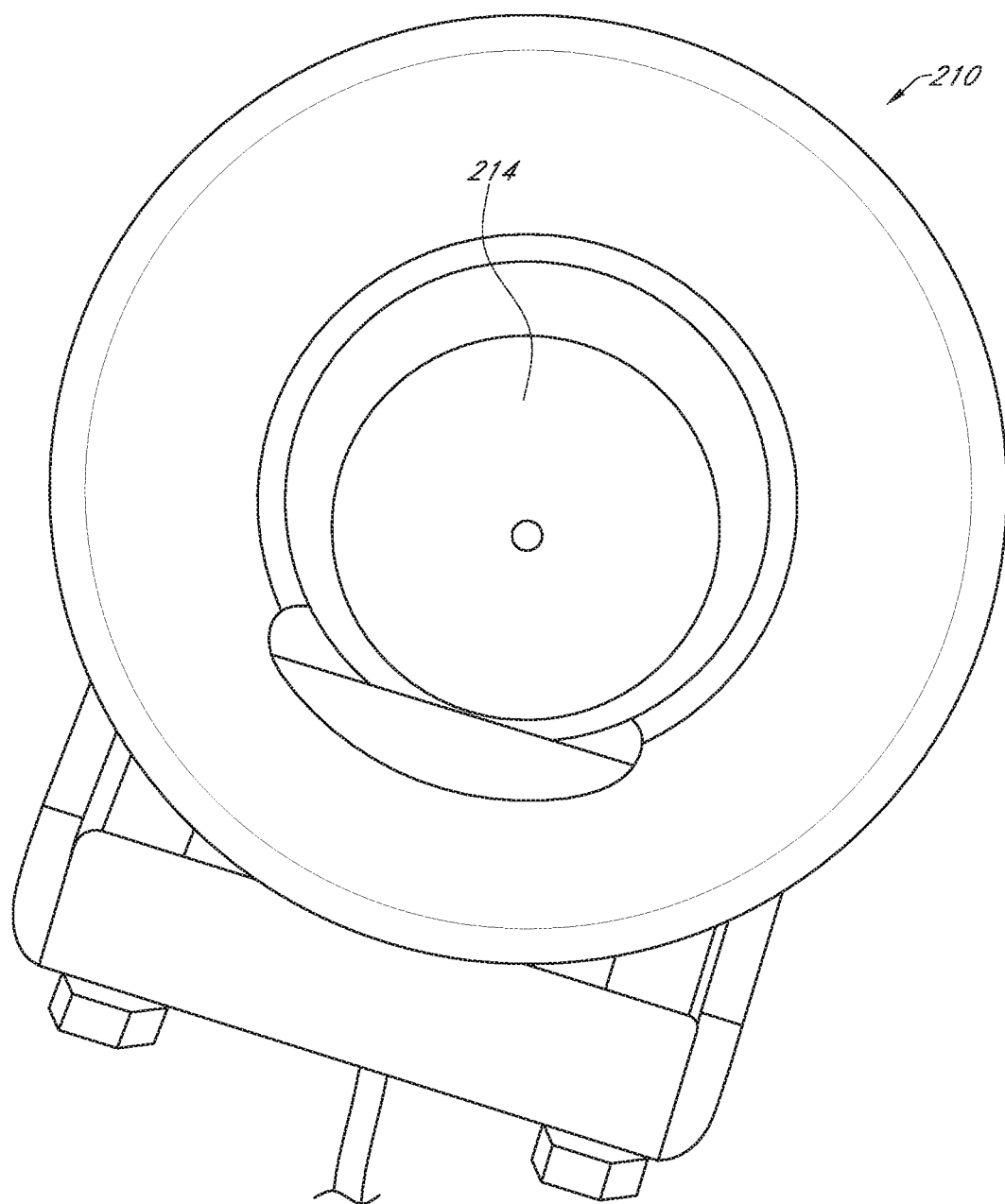
FIG. 19 illustrates a top view of an example hitch adapter.
Figure 20:
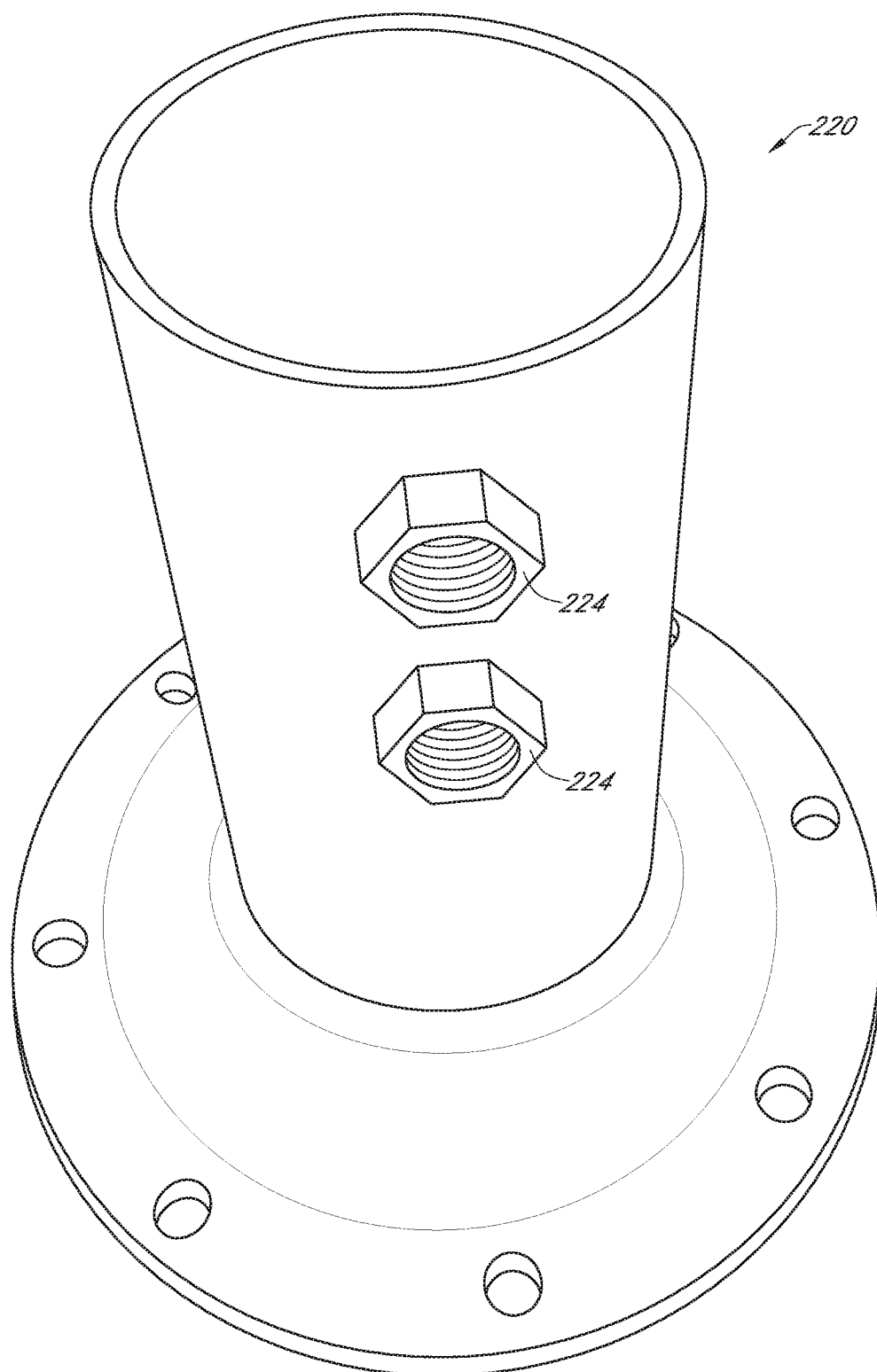
FIG. 20 illustrates a side perspective view of an example hitch adapter.
Figure 21:
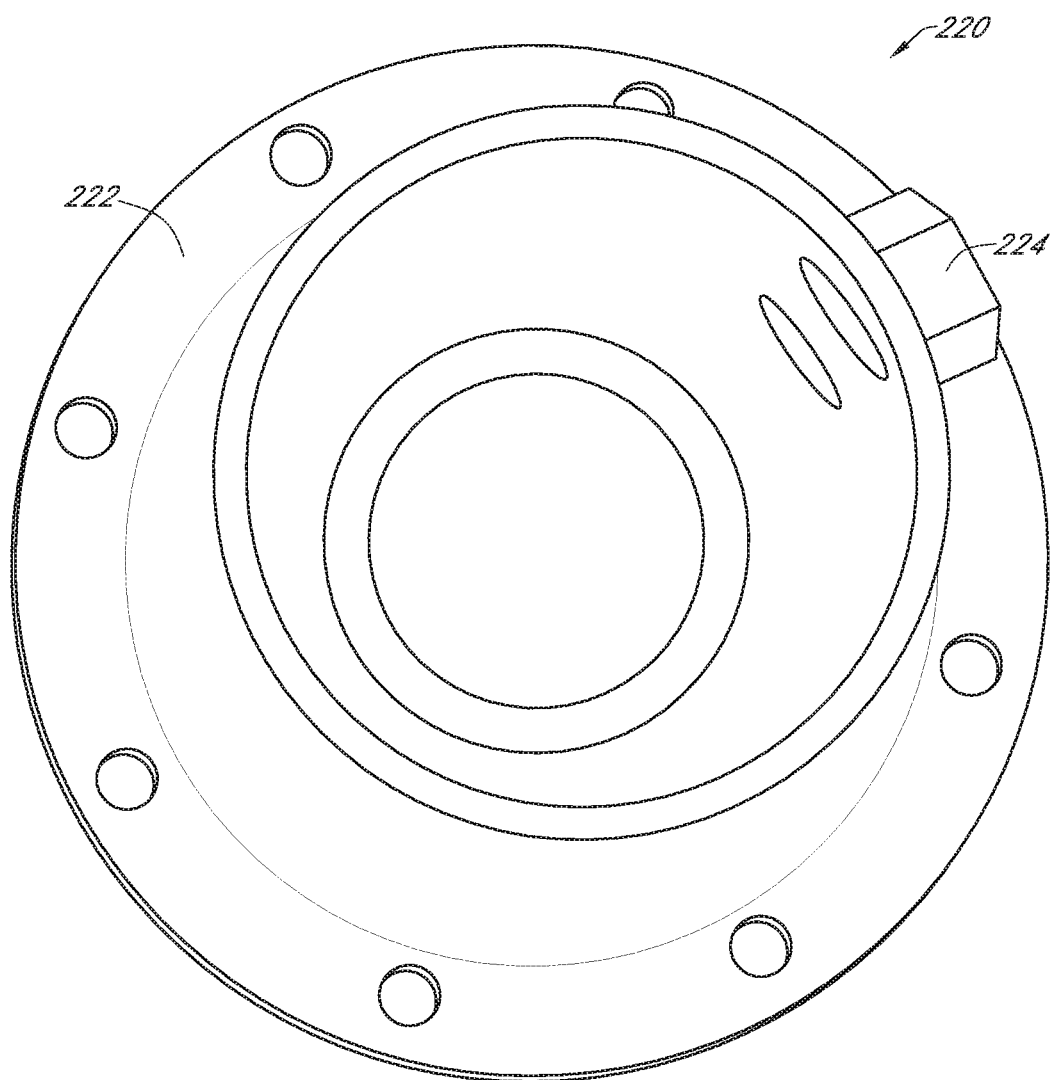
FIG. 21 illustrates a top perspective view of an example hitch adapter.

FIGS. 1A-1D illustrate various example extrusion processes for creating components of the disclosed trailer coupler systems. For example, an extrusion process can be used to manufacture a trailer coupler system or adapter hitch using a die 20 with a particular configuration corresponding to the piece of the system 30 being manufactured. A material 10, such as an aluminum alloy or other material, is extruded through the die 20, resulting in an extruded material 30 that is in the extruded shape of the configuration and that may be selectively cut and prepared for use. For example, as illustrated in FIGS. 1C and 1D, in one implementation a strut 30 is manufactured by extruding an aluminum alloy 10 through a die 20 and then shearing 40 the extruded aluminum alloy material 30 into individual struts. These struts can be welded to other components of the trailer coupler system to form a framed construction. Accordingly an extruded trailer coupler system is provided that includes increased tensile strength, does not rust, is lighter, and is more appealing to consumers.

The extrusion process includes using a die 20 to form extruded pieces 30 for use in manufacturing. The die 20 includes a configuration or opening that is the size and shape of the intended cross-section of the extruded product 30 or profile. The material 10 is extruded through the die opening to provide an extruded profile. In at least one embodiment, the material extruded through the die is aluminum, however those skilled in the art will appreciate that other materials that may be used in accordance with the disclosed systems, wherein the material is forced through a die to obtain a particular shape and would have the strength necessary for use as at least a portion of a trailer coupler system or hitch adapter.

The machinability, finishing, and use of the component that is to be manufactured aids in determining the material extruded. Examples of materials include high strength aluminum alloys, such as 6061-T6, 7075-T6, 7079-T6, 7178-T6, and the like. The aluminum may be directly extruded using a stationary die and a ram that forces the aluminum through the opening in the die. Alternatively, the aluminum may be indirectly extruded by having a die contained within a hollow ram, which moves into a stationary billet from one end, forcing the aluminum to flow into the ram and acquiring the shape of the opening of the die.

Those skilled in the art will appreciate that a variety of extruded shapes may be produced by a variety of different configurations/shapes of the die openings. Moreover, complex shapes may be obtained using complex openings. In one embodiment, a hydraulic press is used to push the aluminum through the opening of the die.

In some embodiments, the material extruded is an alloy. An alloy is a metallic material that typically comprises more than one metallic element. For example, an aluminum alloy may include small amounts of copper, manganese, silicon, magnesium, zinc, and/or another metal. These elements enhance the natural properties of the aluminum alloy and influence the extrusion process. In certain embodiments, the hitch component manufactured through the use of an extrusion process comprises an aircraft quality aluminum alloy. Tensile strengths of alloys used in the extrusion process typically range from 45-88K per square inch, which is greater than the tensile strength typically experienced by a trailer coupler system. In some embodiments, a matte finish, powder coat, a polish, or other finish is provided to the trailer coupler system.

Trailer Coupler System

FIGS. 2-15 illustrate various views of a trailer coupler system 100. In some embodiments, the coupler system 100 includes a lightweight trailer coupler base 110 (examples of which are illustrated in FIGS. 2-12) and a pin adapter 150 (examples of which are illustrated in FIGS. 2 and 13-15). In some embodiments, the coupler system 100 is configured to be strong enough to tow a trailer while weighing less than or equal to about 50 pounds and/or greater than or equal to about 15 pounds, less than or equal to about 45 pounds and/or greater than or equal to about 18 pounds, or less than or equal to about 40 pounds and/or greater than or equal to about 20 pounds. The coupler system 100 can be made to be strong and lightweight due at least in part to being manufactured principally from extruded aluminum. Using extruded aluminum also reduces costs associated with manufacturing by reducing the cost of materials and manufacturing and/or by reducing the time required to make the system.

The trailer coupler base 110 includes a framed construction comprising a plurality of tubular struts 112 having a first end fixedly attached to skid plates 114 and a second end fixedly attached to a sleeve or ball housing 116 for receiving a shaft portion of towball 118. In some embodiments, the towball 118 is a height-adjustable towball, wherein the height of the towball 118 may be adjusted to allow proper or targeted clearance between towing vehicle sideboards and trailer overshot. The ball housing 116 comprises a cavity for receiving the towball 118. In some embodiments, the towball 118 comprises a plurality of pin holes 123 to allow for a vertical height adjustment of the towball 118. This adjustment is provided to allow minor adjustment for clearance requirements between the side boards of the truck and the bottom side of the overshoot of the fifth wheel trailer.

The skid plates 114 can be fixedly attached to support tubes 120 to form a base structure of the trailer coupler base 100, the base structure configured to support the tubular struts 112 and to distribute forces over a relatively large area in the bed of the towing vehicle. The support tubes 120 can be configured to distribute forces on the trailer coupler base 110 across multiple ribs in the bed of the towing vehicle.

The trailer coupler base 110 includes an adapter sleeve 122 coupled to a portion of the ball housing 116. The adapter sleeve 122 can be further supported by a support plate 124, the tubular struts 112, the skid plates 114, and/or the support tubes 120. The adapter sleeve 122 is configured to compatibly receive a towball which is fastened to the bed portion, or another portion, of a towing vehicle. For example, some towing vehicles are modified to include a towball in the bed portion of the vehicle so as to receive a gooseneck trailer. The trailer coupler system 100 is configured to compatibly receive the towball of the towing vehicle thereby being installed in the bed portion of the towing vehicle.

For example, in some embodiments a lumen 123 of the adapter sleeve 122 is configured to directly receive and retain the towball of the towing vehicle. In certain embodiments, the lumen 123 is configured to receive a towball adapter sleeve, wherein a lumen of the towball adapter sleeve is configured to directly receive and retain the towball of the towing vehicle, and the lumen 123 of the adapter sleeve 122 is configured to directly receive and retain the towball adapter sleeve. Thus, the trailer coupler base 110 is secured to the towing vehicle via a secured connection between the towball of the towing vehicle and the adapter sleeve 122. In some embodiments, the towball of the towing vehicle is retained within the lumen 123 via a retaining pin 125.

The trailer coupler base 110 can be configured to be removably installed in a towing vehicle by coupling the adapter sleeve 122 to a towball of the towing vehicle. The trailer coupler base 110 can include the support plate 124 that is configured to provide additional resistance to torsion of the trailer coupler base 110. The support plate 124, for example, can be fixedly attached to a support tube 120 and to the adapter sleeve 122. In some embodiments, the trailer coupler base 110 can be configured so that the support plate 124 is the only structural piece (e.g., besides fasteners such as bolts, nuts, screws, pins, etc.) that is not made from extruded aluminum.

The support plate 124 can be configured to be positioned near the cab or the sides of the towing vehicle or towards the front or sides of the vehicle when installed. This can help provide additional strength to the trailer coupler base 110 when braking, for example. When the tow vehicle brakes, the trailer exerts a forward force on the trailer coupler base 110. The support plate 124 can provide additional strength to the trailer coupler base 110 to resist tendencies to twist or bend under the additional forces.

In some embodiments, the tubular struts 112 are arranged so as to provide a trailer coupler base 110 having a pyramid or quasi-pyramid shape. This triangulated support structure substantially reduces or prevents stresses from being transmitted to the towing vehicle structure in a detrimental way. Thus, the use of the tubular struts 112 in combination with support tubes 120 and skid plates 114 effectively distribute the weight of the recreational vehicle to the frame of the towing vehicle. Other shapes and configurations may be used as well. For example, tubular struts can be used that form triangles that together form another shape or structure besides a pyramid or quasi-pyramid shape. As another example, one or more of the tubular struts can be curved. As another example, tubular struts can be attached to two tubular struts to form a cross-bar support. These variations in design are within the scope of the present disclosure, wherein these variations are configured to position the towball within a targeted range from the bed of the towing vehicle and to be suitably light so that a consumer can readily carry it on their own.

In some embodiments, the towing vehicle includes a towball for coupling to a towball receptacle of a trailer. The trailer coupler base 110 can couple to this towball to removably install the base 110 in the back of the towing vehicle. Thus, if an owner of a towing vehicle desires to equip the towing vehicle with a lightweight coupler system 100, the owner simply installs base 110 in the rear of the vehicle by attaching the base 110 to the towball. As such, a coupler system, a fifth wheel system, or gooseneck towing package system may be added to the vehicle without the need for custom aftermarket hardware, brackets and installation.

Pin adapter 150 generally comprises an adapter housing 152 having a towball coupler 154 and opening 156 for receiving and housing a king pin of a recreational vehicle. The towball coupler 154 includes an interior surface for receiving a towball 118 of the trailer coupler base 110. In some embodiments, the interior surface of the towball coupler 154 comprises a greaseless material configured to reduce or eliminate the need for grease when attaching and removing the towball 118 from the towball coupler 154. For example, the interior surface can include a high density polyethylene or other similar material. The interior surface can be configured to have a different hardness than the towball to which it couples. In addition, the interior surface can be smooth. The difference in hardness, the smoothness, or the combination of the difference in hardness and the smoothness can result in a component that does not easily where out or that resists scratching and other such damage over multiple uses. In some embodiments, the towball coupler 154 comprises a polymer ball socket that is installed or inserted into the cavity of the towball coupler 154 to provide a self-lubricating interface between the hitch ball 118 and the towball coupler 154. In some embodiments, the adapter housing 152 is manufactured from extruded aluminum. As discussed elsewhere herein, the interface between a towball and a housing (e.g., the towball coupler 154) can comprise a polymer, an elastomer, a nylon, or another material or combination of materials. For example in various embodiments, the cap comprises a nylon that includes graphite to eliminate or prevent ultraviolet radiation and to add lubricity to the nylon.

The pin adapter 150 and the towball 118 can be coupled together by aligning the towball coupler 154 and the towball 118 such that the towball 118 is securely inserted within the interior surface of the towball coupler 154. In some embodiments, the towball coupler 154 further comprises a latch remote control cable assembly 158 that actuates an internal locking mechanism. This locking mechanism can be provided to permit selective coupling of pin adapter 150 to trailer coupler base 110. In some embodiments, the cable assembly 158 is actuated to permit the towball 118 to be inserted within the towball coupler 154. Following insertion of the towball 118 into the towball coupler 154, the cable assembly 158 can be actuated to resist or prevent withdrawal of the towball 118 from the towball coupler 154. In some embodiments, the cable assembly 158 further comprises an extension cable and mounting bracket to locate a handle at a convenient location for releasing the towball 118 from the towball coupler 154.

Pin adapter 150 and a king pin of a recreational vehicle can be coupled by inserting the king pin through the opening 156. The king pin of the recreational vehicle can be adjustably secured within the opening 156 by inserting and securing fasteners 157 that are configured to interface with a recess feature of the king pin that allows the king pin to rotate within the opening but resists or prevents the king pin from disengaging with the pin adapter 150. In some embodiments, the ball style connection allows total unobstructed gimbal motion between the towing vehicle and the trailer. In other embodiments, the ball style connection permits total unobstructed gimbal motion without inducing undue stress on the king pin, the pin box, and/or the trailer frame.

It is to be understood that the scope of the present disclosure includes variations on the configuration of the towball, towball housing, pin adapter, and the like that are within the skill of one of ordinary skill in the art. For example, the pin adapter 150 can be configured to include a towball in place of the towball coupler. In such an embodiment, the trailer coupler base 110 can include a towball adapter in place of the towball. Effectively, this switches the towball from the trailer coupler base to the pin adapter and the towball coupler from the pin adapter to the trailer coupler base. When the towball adapter is part of the pin adapter, it can be configured to include a funnel shape to facilitate coupling of the towball.

In some embodiments, the position of the ball housing 116 is offset from the center of the base formed by the skid plates 114 and the support tubes 120. This feature allows the trailer coupler base 110 to be interchangeably used in towing vehicles having either long beds or short beds by adding additional clearance between a trailer overshoot and the cab of the towing vehicle. In addition, the pin adapter 150 is configured to provide additional offset from the ball housing 116. In some embodiments, the total offset from the towball of the towing vehicle to where the king pin of the trailer couples to the pin adapter 150 is at least about 6 inches and/or less than or equal to about 14 inches, at least about 8 inches and/or less than or equal to about 12 inches, or at least about 9 inches and/or less than or equal to about 11 inches. Typically, the trailer coupler base 110 is installed in a towing vehicle so that the support plate 124 is nearest the cab or the sides of the bed of the towing vehicle so that the offset from the towball of the towing vehicle to the opening 156 of the pin adapter 150 is towards the rear of the towing vehicle to provide clearance between the trailer overshoot and the cab of the towing vehicle. Thus, the installation provides additional clearance between the front of the trailer overshoot and the cab of the towing vehicle to prevent collision between the corner of the trailer and the back of the towing vehicle when turning sharp corners on the road.

In some embodiments, the towball 118 of the trailer coupler base 110 is elevated within the bed of the towing vehicle so as to be approximately equal in height to the king pin of the fifth wheel trailer pin box structure. This can be done to position the fifth wheel trailer approximately parallel to the bed surface of the towing vehicle. Accordingly, some embodiments reduce or eliminate excessive leverage which otherwise may be encountered in coupling a fifth wheel trailer to a towing vehicle.

As described herein, the coupler system 100 can be made primarily or entirely from extruded aluminum. In some embodiments, the lightweight nature of the system 100 enables a single person to install and remove the lightweight base 110 in less than about 30 seconds. Additionally, the modular nature of the system 100 enables a single person to easily remove the base 110 from the towing vehicle bed to provide a clean truck bed. Still further, in some embodiments, the gimbal action of the towball system brings full unobstructed gimbal action into the connection between the towing vehicle and the recreational vehicle. This feature allows for connection and disconnection between the two vehicles even where there is a twisted and/or angular relationship between the two vehicles due to irregular terrain.

In some embodiments, a ball and socket interface between the trailer coupler base 110 and the adapter pin 150, via the towball 118 and the towball coupler 154, permits a gimbaled relationship between the towing vehicle and the fifth wheel trailer. In some embodiments, this unrestricted gimbal action permits 360° rotation between the towing vehicle and the trailer from a flat plane. This unrestricted motion further eliminates all stresses which would be experienced with standard fifth wheel coupler systems and assemblies.

The oblique pyramid configuration of the trailer coupler system 100 allows for installation in both short and long bed towing vehicles. The offset of the coupler system 100 is mounted in a forward direction so as to position the towball 118 towards the proximal end of the long truck bed. Further, the offset of the coupler system 100 is mounted in a rearward direction in a short truck bed so as to position towball 120 toward the distal end of the truck bed. With the offset in the rearward position, in a short truck bed, the normal use of a "slider hitch" is eliminated. Rather, the rearward mounting of coupler system 100 moves the trailer rearward in the truck bed so that the front of the trailer overshot will not collide with the back of the truck cab, for example, as when making tight turns such as when backing up to maneuver a trailer into a desired parking space. In some embodiments, the coupler block on the kingpin can be positioned forwards or backwards of the towball 118. For example, if the pin box is long it may be beneficial to effectively shorten the pin box distance through placement of the coupler block to avoid collision with items in the bed of the towing vehicle, such as a toolbox or toolboxes on the sides of the bed.

The tubular struts 112 can be made from tubes with an inner radius of about 0.625 inches and an outer radius of about 0.75 inches, or the tubular struts 112 can be between about 1.25 inches and about 3 inches wide with the walls of the tubular struts 112 being about 0.100 inches to about 0.250 inches thick, or between about 0.125 inches and about 0.190 inches thick. The tubular struts 112 can be between about 17 inches to about 24 inches long, or between about 20 inches to about 22 inches long. The skid plates 114 can be between about 4 inches and about 8 inches wide, or between about 5 inches and about 6 inches wide and can be about 24 inches to about 48 inches long, or between about 32 inches to about 36 inches long. The support tubes 120 can be between about 1.25 inches to about 3 inches wide, or between about 1 inch to about 2 inches wide, and between about 17 inches and about 24 inches, or between about 20 inches to about 22 inches long. The walls of the support tubes 120 can be between about 0.100 inches to about 0.250 inches thick, or between about 0.125 inches and about 0.190 inches thick. The towball housing 116 can be configured to be positioned between about 9 inches to about 21 inches, or between about 12 inches to about 16 inches above the bed of the towing vehicle. The towball housing 116 can be configured to support the towball 118 between about 2 inches and about 6.5 inches above the towball housing, or between about 3 inches and about 5.25 inches above the towball housing. The position of the towball 118 and the towball housing 116 can be configured so that the height of the trailer coupler system 100 in the bed of a towing vehicle reduces the size of the lever arm of the kingpin or other connector of the trailer, to reduce forces on the trailer where the connector is attached to the trailer. This height can also be configured to be sufficiently short to withstand the loads that are placed on it while towing a trailer. In some embodiments, the tubular struts 112 can have a rectangular, triangular, circular, elliptical, or oval cross-section. In some embodiments, the support tubes 120 can have a rectangular, triangular, circular, elliptical, or oval cross-section.

In some embodiments, the adapter sleeve 122 and internal tube 121 can have a cross-section that is square, triangular, oval, rectangular, or the like. The adapter sleeve 122 and the internal tube 121 can be configured so that the internal tube does not spin within the adapter sleeve 122. The internal tube 121 can be configured to be telescoping within the adapter sleeve 122 to extend to attach to a towball in the bed of a towing vehicle. The tightening bolt 127 can be configured to put downward pressure on the internal tube 121. This can effectively pre-stress the bed of the towing vehicle so that the trailer coupler base 110 remains stationary in the bed of the vehicle by causing a sufficiently strong force to be experienced between the skid plates 114 and the bed of the vehicle. This can substantially prevent the trailer coupler base 110 from spinning within the bed of the vehicle when installed. In some embodiments, the tightening bolt 127 can be replaced with another mechanism to apply downward pressure on the inner tube 121. This can be, for example and without limitation, a locking lever, a cam, or the like. By applying this downward force and pre-stressing the load in the bed of the towing vehicle, the vehicle can drive relatively smoothly and substantially reduce or eliminate the effects of "bucking and chucking" while driving.

In some embodiments, the trailer coupler base 110 is a fully welded assembly with no moving parts, except for the height adjustment of the towball 118 within the towball housing 116.

In some embodiments, the disclosed systems can be configured to be compatible with various types of gooseneck hitches, fifth wheel hitches, and/or any type of device that can be anchored to the towball, which is coupled to the frame of the vehicle or a gooseneck hitch. In some embodiments, the king pin of the trailer to be towed is replaced with a towball and trailer coupler base 110 is modified to include a towball coupler configured to receive the towball of the trailer. Thus, one having skill in the art will appreciate that the concepts disclosed herein are capable of being applied to a traditional fifth wheel configuration through a number of alternative designs.

Other examples of coupler systems are described in U.S. Pat. No. 8,523,217 to Andersen, issued Sep. 3, 2013, entitled "Vehicle Frame for Trailer Coupler System," the entirety of which is incorporated herein by reference.

Figure 23:
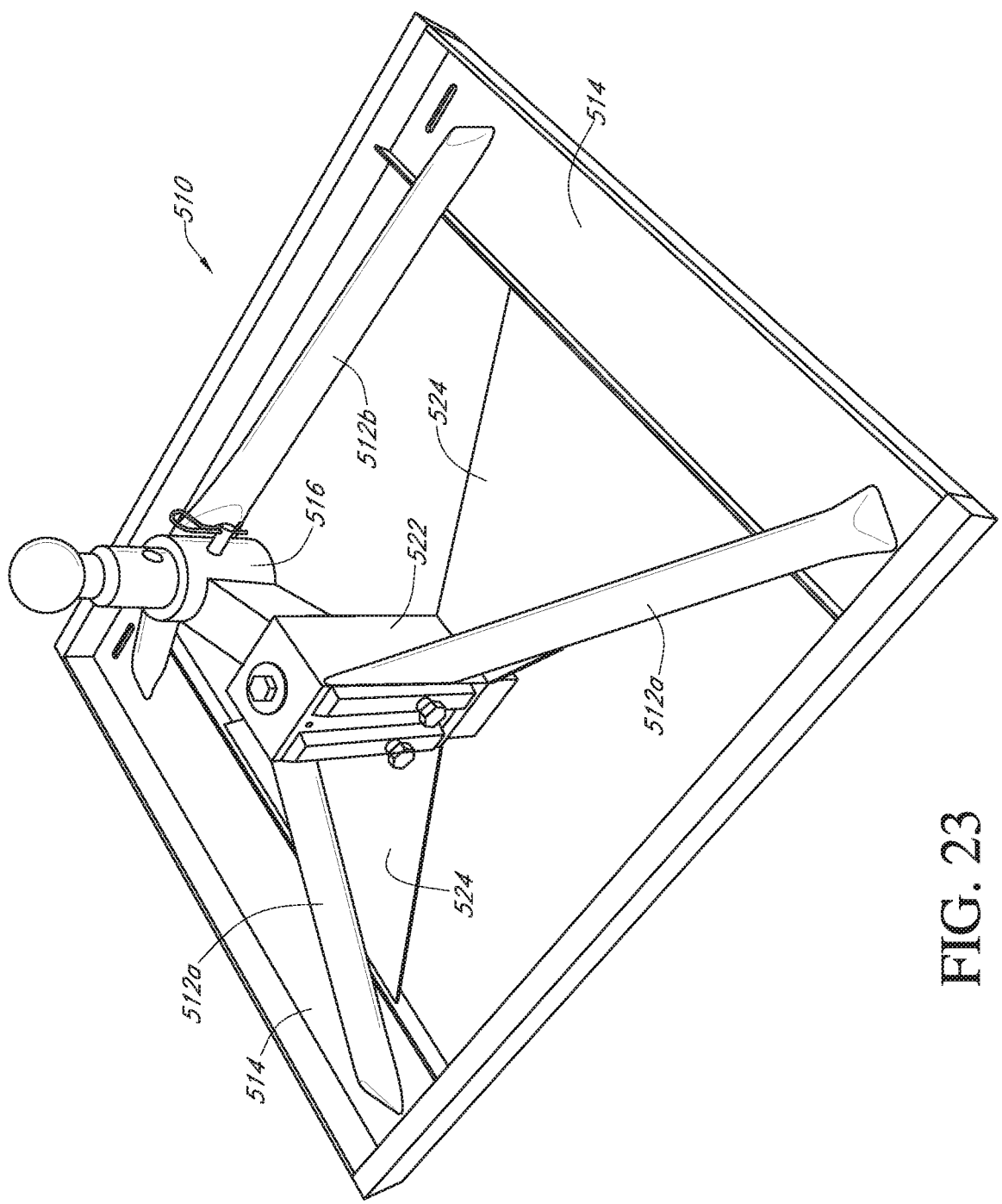
FIG. 23 illustrates an example of another embodiment of a trailer coupler system.

FIG. 23 illustrates another example embodiment of a trailer coupler base 510. The trailer coupler base 510 includes support plates 524 that attach to skid plates 514 and adapter sleeve 522. The support plates 524 can be positioned on the sides of the trailer coupler base 510 to provide resistance to twisting of the trailer base 510. The trailer coupler base 510 includes a pair of tubular struts 512*a* attached to the adapter sleeve 522 and a pair of tubular struts 512*b* attached to a towball housing 516.

While in use, the trailer coupler system experiences a variety of forces and pressures during driving. Accordingly, the trailer coupler base 110, 510 is designed to withstand particular driving conditions. For example, a trailer coupler system can be installed in a 2011 Ford F 350 and coupled to an 18,000 pound 44 foot toy hauler trailer. The brakes on the trailer can be turned completely off to get a large amount of forward and rear force during the towing testing. By taping off some lines in the bed of the truck, shifting of the trailer coupler system can be detected. As an in-field test, the trailer can be attached to the trailer coupler system and towed approximately 2.5 miles down a road that has bumps and stop signs during which several hard braking stops can be executed. It is desirable that substantially no movement or very little movement occurs between the truck and the trailer. In addition, other hard braking tests may be performed. For example, with the highest towball position, hard braking tests can be performed to create the highest torque and forces expected on the trailer coupler system for the particular situation being tested. With the towball in this position, a hard acceleration can be performed from 0 to a speed of about 15 miles per hour over a distance of about 150 feet and then a hard brake to a stop in approximately 7 feet. Other tests can be performed to test performance during backing up and stopping, e.g., to test the forces on the trailer coupler system in other directions. These tests can be repeated with the towball in different positions (e.g., different heights). The trailer coupler system can be stress tested by putting it into a hydraulic press to test the fail point.

Hitch Adapter

FIGS. 16-21 illustrate various views of a hitch adapter 200 comprising a towball interface 210 and a mounting sleeve 220. The housing 212 of the towball interface 210 can be made of extruded aluminum and can include a greaseless towball receptacle 214. The hitch adapter 200 is configured to adapt any king pin style, fifth-wheel trailer king pin box to attach to a standard ball hitch, such as a 25/16 inch standard ball hitch. In some embodiments, the vertically adjustable hitch adapter 200 comprises a telescoping towball interface 210 within the mounting sleeve 220. The mounting sleeve 220 can include a base plate 222 for installation on a trailer. By telescoping the towball interface 210 and the mounting sleeve 220, the hitch adapter 200 allows several inches of vertical adjustment of length of the hitch adapter 200. In some embodiments, vertical adjustment of at least three inches is available. The user can manipulate the adapter 200 to provide greater or lesser clearance between the side-boards of the bed of the truck and the trailer overshot. The vertical adjustment feature also permits the user to level the trailer with respect to the ground, providing for better towing.

The towball interface 210 comprises a bell-shaped opening for mating with a standard ball hitch of a towing vehicle. The bell-shaped opening alleviates difficulties associated with coupling a trailer hitch to a standard ball hitch that may be due at least in part to the necessity to very accurately align the standard ball hitch and the coupling apparatus. The bell-shaped opening of the towball interface 210 allows the user to be off center, typically less than or equal to about 2.5 inches off center, or less than or equal to about 5 inches off center, and still mate the towball interface 210 and the standard ball hitch without needing to jockey the truck around to achieve proper alignment for hookup.

When coupling the trailer to a typical hitch, it is generally required to crawl into or reach into the truck bed to latch or unlatch the adapter locking mechanism. The adapter hitch 200 eliminates this practice with the combination of a linear cable actuator 216 and remote handle 218 located at a convenient location where the user can latch or unlatch the hitch without the awkward problems typically present in such an endeavor.

The mounting sleeve 220 can be attached to the trailer king pin box by fastening the base plate 222 to the pin box. The towball interface 210 can be secured within the mounting sleeve 220 using threaded fastener interfaces 224 that allow threaded fasteners to apply a force to the towball interface 210 to maintain it within the mounting sleeve 220.

Once the adapter hitch 200 has been secured to the trailer king pin box and to the trailer frame, the trailer can be coupled to a standard ball hitch. The latching mechanism is locked by twisting and pushing the handle 218 in as far as it will go and then twisting the handle 218 to lock it in position.

To detach the adapter hitch 200 from the standard ball hitch, the handle 218 is twisted, pulled out fully, and twisted again. This action releases a hardened latch pin 220, and allows the towball interface 210 to fit over a standard ball hitch. The trailer is raised to clear the standard ball hitch, any wiring harnesses and safety cables are released, and the truck is driven out from under the trailer.

Other examples of hitch adapters are described in U.S. Pat. No. 6,540,246 to Andersen et al., issued Apr. 1, 2003, entitled "Ranch Hitch Adapter," the entirety of which is incorporated herein by reference.

Horse Trailer Example Embodiment

Figure 22A:
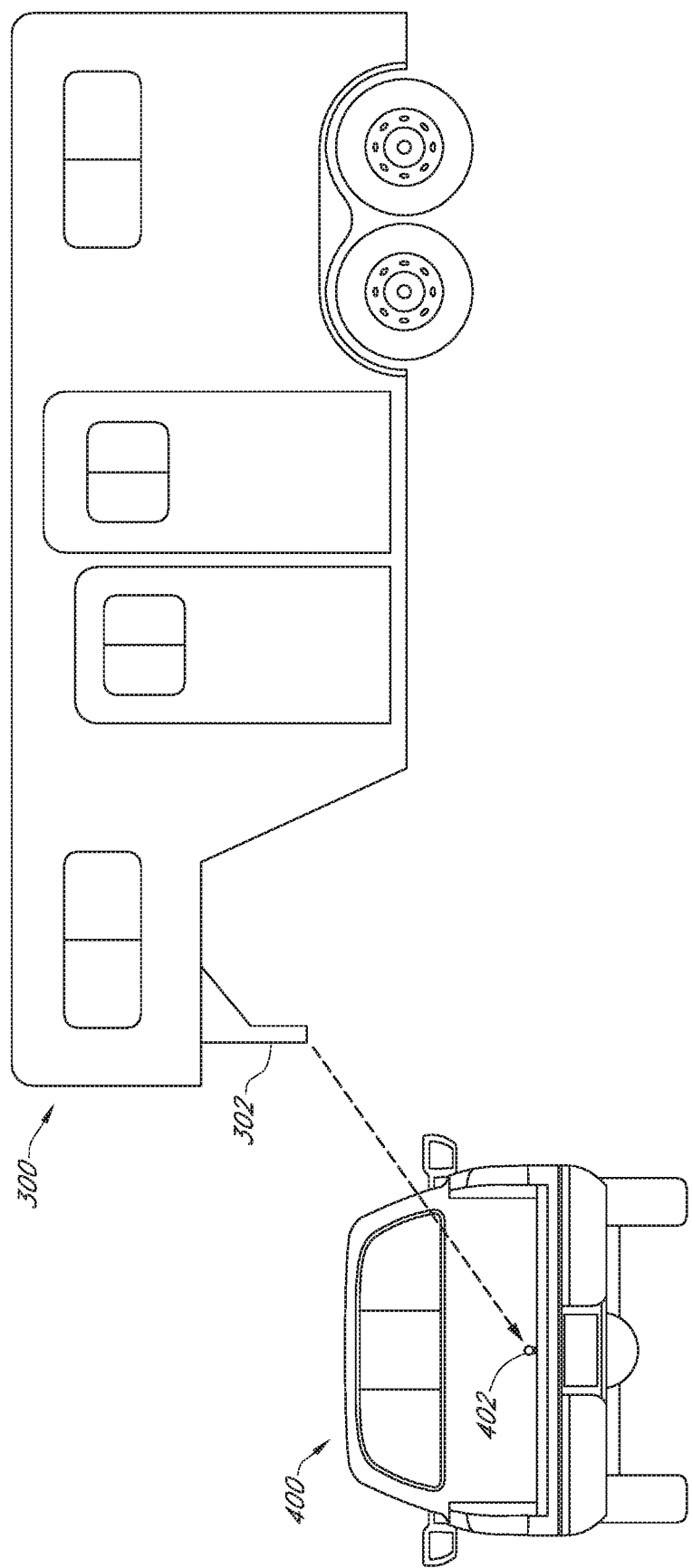
FIGS. 22A and 22B illustrate a comparison of connecting a horse trailer to a towing vehicle with a towball in the bed with connecting a horse trailer with the example hitch adapter illustrated in FIGS. 16-21 to a tow vehicle with an example trailer coupler system illustrated in FIGS. 2-12, 23.
Figure 22B:
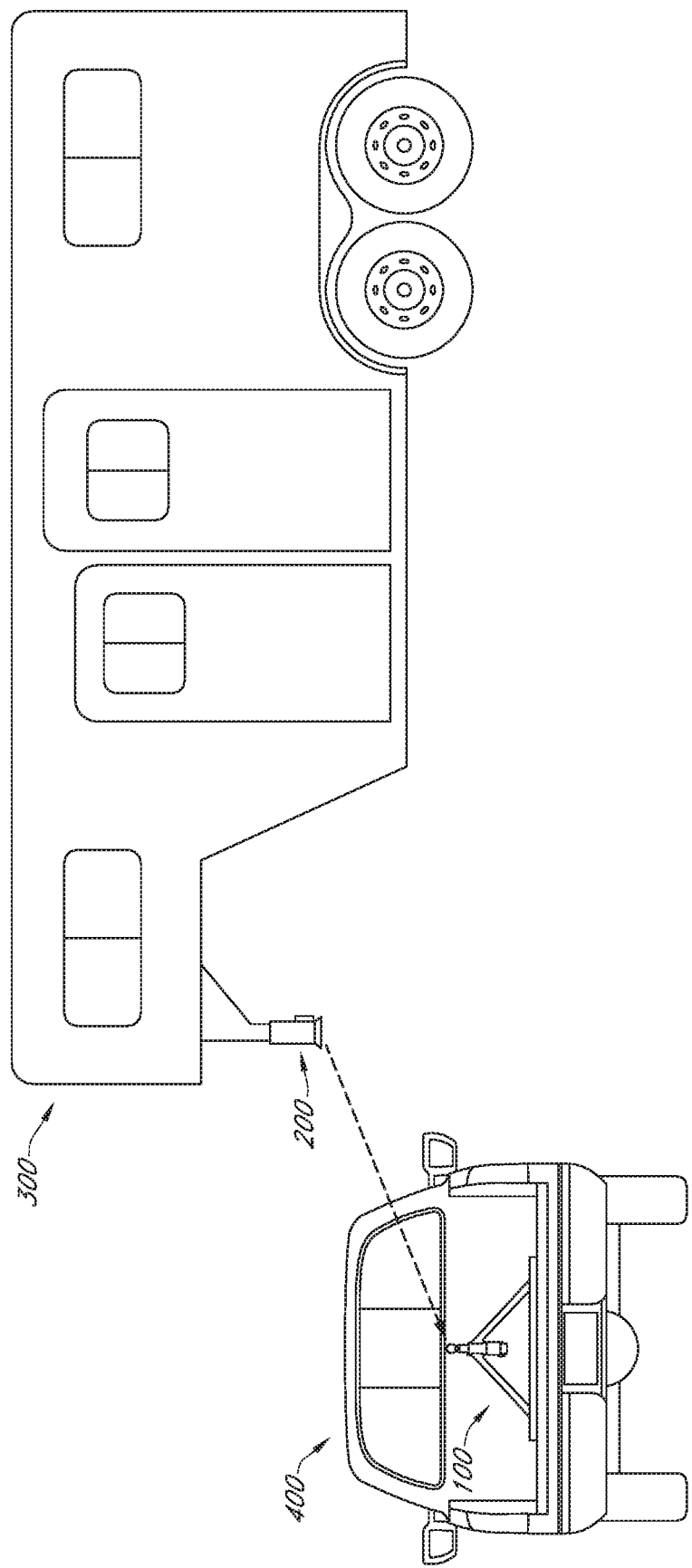

FIGS. 22A and 22B illustrate a comparison of connecting a non-kingpin trailer (e.g., a horse trailer) to a towing vehicle with a towball in the bed (FIG. 22A) with connecting a non-kingpin trailer (e.g., a horse trailer) with the example hitch adapter illustrated in FIGS. 16-21 to a tow vehicle with an example trailer coupler system illustrated in FIGS. 2-12, 23 (FIG. 22B). In FIG. 22A, the ball hitch 402 is positioned at the bed of the tow vehicle 402. The trailer adapter 302 (e.g., a gooseneck adapter or other non-kingpin connection) of the trailer 300 extends downward to connect to the ball hitch 402. This can result in a relatively long trailer adapter 302 which increases the length of the lever arm, causing the trailer 300 to experience greater forces at the connection between the trailer adapter 302 and the trailer 300 when compared to a shorter trailer adapter 302. If the forces are sufficiently large in this configuration, damage may occur to the trailer. FIG. 23 illustrates another example embodiment of a trailer coupler base 510. The trailer coupler base 510 includes support plates 524 that attach to skid plates 514 and adapter sleeve 522. The support plates 524 can be positioned on the sides of the trailer coupler base 510 to provide resistance to twisting of the trailer base 510. The trailer coupler base 510 includes a pair of tubular struts 512a attached to the adapter sleeve 522 and a pair of tubular struts 512b attached to a towball housing 516.

FIG. 22B illustrates an example trailer coupler system 100 and a hitch adapter 200 to couple a non-kingpin trailer 300 (e.g., a horse trailer) to a towing vehicle 400. A non-kingpin trailer differs from a kingpin trailer in that the latter includes a kingpin connector (e.g., a fifth wheel connection, described above) while the latter includes a different type of connector that can interface with a towball directly (e.g., a horse trailer with a gooseneck adapter).

The configuration illustrated in FIG. 22B reduces the length of the lever arm by increasing the height of the towball attachment point. In some embodiments, this height can be increased by at least about 10 inches and/or less than or equal to about 21 inches, at least about 12 inches and/or less than or equal to about 18 inches, or at least about 14 inches and/or less than or equal to about 15 inches. This means that the trailer can be configured to withstand greater forces without damage than a similar trailer with a longer trailer adapter, such as the situation illustrated in FIG. 22A. Referring again to FIG. 22B, the trailer coupler system 100 can be installed in the bed of the towing vehicle 400 by attaching a towball of the towing vehicle 400 to the adapter sleeve 122 described herein with reference to FIGS. 2-12, 23. The hitch adapter 200 can be attached to the horse trailer using the mounting sleeve 220, described herein with reference to FIGS. 16-21. The hitch adapter 200 can then be attached to the trailer coupler system 100 by inserting the towball 118 of the trailer coupler system 100 into the towball receptacle 214 of the towball interface 210. This can allow the length of the stem extending from the horse trailer 300 to be shorter than it would be without the disclosed hitch adapter 200 and trailer coupler system 100. This can improve control and the feel of towing the trailer 300 with the towing vehicle 400. In particular, this can reduce or substantially eliminate the "chucking and bucking" effect felt when towing a trailer with a longer trailer adapter (e.g., a gooseneck or other non-kingpin adapter). The trailer coupler base can be configured to distribute the load of the trailer over a larger area within the bed of the towing vehicle than a typical ball hitch in the bed of the vehicle. This can effectively distribute the forces applied in the bed of the vehicle to make driving the vehicle more steady and predictable and easier to manage. In addition, the trailer coupler base can effectively direct the forces applied to it to desired locations in the bed of the vehicle (e.g., forward of the rear axle) to increase driving stability (e.g., elimination or reduction of the "bucking and chucking" effect).

Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The terms "about" or "approximate" and the like are synonymous and are used to indicate that the value modified by the term has an understood range associated with it, where the range can be ±20%, ±15%, ±10%, ±5%, or ±1%. The term "substantially" is used to indicate that a result (e.g., measurement value) is close to a targeted value, where close can mean, for example, the result is within 80% of the value, within 90% of the value, within 95% of the value, or within 99% of the value.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A trailer coupler system, comprising:
   one or more skid plates made from extruded aluminum;
   one or more support tubes attached to the skid plates, the support tubes comprising extruded aluminum;
   a plurality of struts having a first end attached to the one or more skid plates, the plurality of struts being made from extruded aluminum;
   a ball housing attached to a second end of at least two of the plurality of struts, the ball housing being made from extruded aluminum;
   a first towball positioned within the ball housing, the first towball made from extruded aluminum;
   an adapter sleeve attached to the ball housing, the adapter sleeve configured to be secured to a towball in a towing vehicle, the adapter sleeve being made from extruded aluminum;
   a support plate extending from a support tube or a skid plate to the adapter sleeve; and
   an adapter having a kingpin coupler for coupling to a kingpin of a trailer, and a towball coupler for directly coupling with the first towball,
   wherein the one or more skid plates, the one or more support tubes, the plurality of struts, the ball housing, the first towball, the adapter sleeve, and the support plate collectively weigh less than or equal to about 45 pounds.

2. The system of claim 1, wherein the support plate is attached to a first skid plate of the one or more skid plates and a second support plate is attached to a second skid plate of the one or more skid plates.

3. The system of claim 1, wherein the support plate is made from steel.

4. The system of claim 3, wherein the support plate is the only component not made from extruded aluminum.

5. A method of manufacturing an extruded aluminum trailer coupler system, the method comprising:
   extruding aluminum to form extruded aluminum with a tubular cross-section;
   shearing the extruded aluminum with a tubular cross-section such that points where the extruded aluminum is sheared flatten to close a lumen of the tubular-cross section to form a plurality of tubular struts;
   extruding aluminum to form extruded aluminum with a cross-section having a squared-off u-shape;
   cutting the extruded aluminum with the cross-section having a squared-off u-shape to form a plurality of skid plates;
   extruding aluminum to form extruded aluminum with a hollow, rectangular cross-section;
   cutting the extruded aluminum with the hollow, rectangular cross-section to form a plurality of support tubes;
   forming a base of the trailer coupler system performing at least the steps of:
      welding a first skid plate to two support tubes near respective first ends of the two support tubes; and
      welding a second skid plate to the two support tubes near respective second ends of the two support tubes;
   welding a first two or more of the plurality of tubular struts to the first skid plate;
   welding a second two or more of the plurality of tubular struts to the second skid plate; and
   welding the first and second two or more tubular struts to a ball housing made of extruded aluminum such that a towball secured within the ball housing is positioned between about 10 inches and about 21 inches above the base of the trailer coupler system.

6. The method of claim 5 further comprising welding one part of a support plate that is not made from extruded aluminum to an adapter sleeve coupled to the ball housing and another part of the support plate to at least one of the skid plates or the support tubes forming the base of the trailer coupler system.

7. A lightweight hitch system configured to be installed in a bed of a towing vehicle, the hitch system also configured to couple to a gooseneck trailer adapter of a trailer thereby reducing a length of a lever arm of the trailer adapter by raising a coupling point above the bed of the towing vehicle, the reduction of the length of the lever arm increasing an amount of towing forces that the trailer adapter can withstand without damage, above a system where the trailer adapter is coupled directly with a vehicle bed towball operably attached to the bed of the towing vehicle, the hitch system comprising:
   one or more skid plates;
   one or more support members operably attached to the one or more skid plates;
   a plurality of frame members, each frame member operably attached to one or more of the one or more skid plates;
   a shaft;
   a housing operably supported by the plurality of frame members, the housing configured to allow vertical adjustment of the shaft when inserted into the housing;
   a vertically adjustable sleeve operably supported by at least the plurality of frame members, the adjustable sleeve configured to be secured to the vehicle bed towball operably attached to the towing vehicle, said sleeve operably attached to said plurality of frame members to operably exert a draw down force on said one or more skid plates; and one or more support plates operably positioning and operably supporting at least the adjustable sleeve; and a coupler operably coupling the shaft to the gooseneck trailer adapter of the trailer.

8. The lightweight hitch system of claim 7, wherein at least one or more of said (i) one or more skid plates, (ii) said one or more support members, (iii) said plurality of frame members, (iv) said housing, and (v) said sleeve, comprise extruded aluminum, and wherein said (i)-(v), said one or more support plates, and at least a portion of said coupler collectively weigh greater than or equal to about fifteen pounds (15 lbs.) and less than or equal to about fifty pounds (50 lbs.).

9. The lightweight hitch system of claim 8, wherein said shaft and said coupler comprise extruded aluminum.

10. The lightweight hitch system of claim 8, wherein said (i)-(v) each comprise extruded aluminum and wherein said (i)-(v), said one or more support plates, and said at least said portion of said coupler collectively weigh greater than or equal to about eighteen pounds (18 lbs.) and less than or equal to about forty-five pounds (45 lbs.).

11. The lightweight hitch system of claim 10, wherein said (i)-(v), said one or more support plates, and said at least said portion of said coupler collectively weigh greater than or equal to about twenty pounds (20 lbs.) and less than or equal to about forty pounds (40 lbs.).

12. The lightweight hitch system of claim 7, wherein said one or more support plates comprise steel.

13. The lightweight hitch system of claim 7, wherein said coupler comprises a towball coupler.

14. The lightweight hitch system of claim 7, wherein said shaft comprises a towball shaft and said coupler comprises a towball attached to said towball shaft.

15. The lightweight hitch system of claim 7, wherein said coupler comprises a mounting sleeve.

16. The lightweight hitch system of claim 15, wherein said coupler further comprises a towball interface.

17. The lightweight hitch system of claim 7, wherein said shaft comprises through holes for adjusting a vertical position of said shaft within said housing.

18. The lightweight hitch system of claim 7, wherein said shaft comprises a cylinder.

19. The lightweight hitch system of claim 7, wherein said sleeve comprises draw down hardware including a bolt and corresponding threads, the cooperation of which pulls said sleeve toward said bed of said towing vehicle.

20. The lightweight hitch system of claim 7, wherein each of the one or more skid plates comprises a length and a width, wherein the length is greater than the width.

* * * * *